(12) United States Patent
Kim et al.

(10) Patent No.: US 10,491,742 B2
(45) Date of Patent: Nov. 26, 2019

(54) MOBILE TERMINAL AND CONTROL METHOD THEREOF

(71) Applicant: LG ELECTRONICS INC., Seoul (KR)

(72) Inventors: Jonghwan Kim, Seoul (KR); Hyungjin Kim, Seoul (KR); Yunmi Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 14/736,150

(22) Filed: Jun. 10, 2015

(65) Prior Publication Data
US 2016/0150071 A1 May 26, 2016

(30) Foreign Application Priority Data

Nov. 21, 2014 (KR) .......................... 10-2014-0163704

(51) Int. Cl.
*H04M 1/725* (2006.01)
*H04W 4/021* (2018.01)
(Continued)

(52) U.S. Cl.
CPC ...... *H04M 1/72572* (2013.01); *G06F 3/0485* (2013.01); *G06F 3/0488* (2013.01);
(Continued)

(58) Field of Classification Search
CPC ......... H04M 1/72566; H04M 1/72572; H04M 2250/22; H04M 2250/52; H04W 4/021;
(Continued)

(56) References Cited

U.S. PATENT DOCUMENTS 6,222,583 B1 * 4/2001 Matsumura ........ G01C 21/3635
345/619
2007/0022447 A1 * 1/2007 Arseneau .............. G06F 1/1626
725/74
(Continued)

FOREIGN PATENT DOCUMENTS

| CN | 102457617 | 5/2012 |
|----|-----------|--------|
| WO | 2008080640 | 7/2008 |
| WO | 2014088253 | 6/2014 |

OTHER PUBLICATIONS

European Patent Office Application No. 15185109.4, Search Report dated Mar. 23, 2016, 8 pages.
(Continued)

*Primary Examiner* — Erica Navar
(74) *Attorney, Agent, or Firm* — Lee, Hong, Degerman, Kang & Waimey PC

(57) ABSTRACT

A mobile terminal executing a function providing information using a graphic object including information includes: a display unit; a state sensing unit configured to sense state information of a mobile terminal; a wireless communication unit configured to perform communication with an external server storing a plurality of information; and a control unit configured to, when particular information is selected according to a user's control command, output a graphic object including at least one information among the plurality of information stored in the external server on the display unit on the basis of the particular information and the state information of the mobile terminal, wherein the at least one information is information related to the particular information and the state information of the mobile terminal.

12 Claims, 38 Drawing Sheets

(51) Int. Cl.
  *G06F 3/0488*  (2013.01)
  *G06F 3/0485*  (2013.01)
  *G06F 3/0481*  (2013.01)

(52) U.S. Cl.
  CPC ...... *G06F 3/04817* (2013.01); *G06F 3/04883* (2013.01); *H04W 4/021* (2013.01); *H04M 1/72566* (2013.01); *H04M 2250/22* (2013.01); *H04M 2250/52* (2013.01)

(58) Field of Classification Search
  CPC ............. G06F 3/04883; G06F 3/04817; G06F 3/0485; G06F 3/0488; G06F 17/246
  See application file for complete search history.

(56) References Cited

U.S. PATENT DOCUMENTS

| | | |
|---|---|---|
| 2009/0102859 A1 | 4/2009 | Athsani et al. |
| 2012/0096403 A1 | 4/2012 | Jung et al. |
| 2014/0282155 A1 | 9/2014 | Kim |

OTHER PUBLICATIONS

European Patent Office Application Serial No. 15185109.4, Office Action dated Jul. 19, 2018, 4 pages.
The State Intellectual Property Office of the People's Republic of China Application Serial No. 201510523384.X, Office Action dated Jul. 3, 2019, 10 pages.

\* cited by examiner

MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2014-00163704 filed on Nov. 21, 2014, the contents of which is incorporated by reference herein in its entirety.

BACKGROUND OF THE INVENTION

1. Field of the Invention

The present disclosure relates to a mobile terminal providing various types of information and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

In order to support and increase functions of terminals, improvement of structural parts and/or software parts of terminals may be taken into consideration.

Recently, various types of information are transmitted and received between terminals, and various types of terminals are stored in a single server. Such various types of information is called big data, and big data is utilized in various manners.

In the present disclosure, a method for providing information appropriate for users to users by utilizing big data.

SUMMARY OF THE INVENTION

Therefore, an aspect of the detailed description is to provide a method for allowing a user to directly select information, as well as simply providing information received from an external server.

Another aspect of the detailed description is to provide various methods for utilizing provided information.

To achieve these and other advantages and in accordance with the purpose of this specification, as embodied and broadly described herein, a mobile terminal executing a function providing information using a graphic object including information may include: a display unit; a state sensing unit configured to sense state information of a mobile terminal; a wireless communication unit configured to perform communication with an external server storing a plurality of information; and a control unit configured to, when particular information is selected according to a user's control command, output a graphic object including at least one information among the plurality of information stored in the external server on the display unit on the basis of the particular information and the state information of the mobile terminal, wherein the at least one information is information related to the particular information and the state information of the mobile terminal.

In an exemplary embodiment of the present disclosure, the control unit may display a graphic object including the particular information and the state information of the mobile terminal near a region in which the graphic object including the at least one information is output.

In an exemplary embodiment of the present disclosure, the state information of the mobile terminal may be at least one among location information, time information, application information installed in the mobile terminal, application information being executed in the mobile terminal, and text and image information previously stored in the mobile terminal.

In an exemplary embodiment of the present disclosure, any one home screen page among a plurality of home screen pages including at least one icon and at least one widget may be displayed on the display unit, and the control unit may display a widget including the at least one information on a preset home screen page among the plurality of home screen pages.

In an exemplary embodiment of the present disclosure, the preset home screen page may be a home screen page previously set by a user to display the widget including the at least one information or any one home screen page being displayed on the display unit.

In an exemplary embodiment of the present disclosure, when the state information of the mobile terminal is changed, the widget including the at least one information may disappear from the display unit.

In an exemplary embodiment of the present disclosure, when a touch is applied to the widget including the at least one information displayed on the preset home screen page, the control unit may output an execution screen of the information providing function.

In an exemplary embodiment of the present disclosure, the mobile terminal may further include: a camera configured to capture an image, wherein when an image is captured by the camera, the control unit may output a graphic object including at least one information related to the captured image and the state information of the mobile terminal on the display unit, on the basis of the captured image and the state information of the mobile terminal.

In an exemplary embodiment of the present disclosure, when the camera is activated, the control unit may output a graphic object including an image received from the camera on the display unit.

In an exemplary embodiment of the present disclosure, when the function for providing information is executed, the control unit may output a graphic object including usage history information of an application installed in the mobile terminal.

In an exemplary embodiment of the present disclosure, a graphic object for selecting the particular information may be output on the display unit, and when the particular information is selected through an object for selecting the particular information, the control unit may display the particular information and the state information of the mobile terminal in a graphic object for selecting the particular information.

In an exemplary embodiment of the present disclosure, on the basis of the state information of the mobile terminal, the control unit may output a graphic object including guide information indicating that at least one information related to the state information of the mobile terminal can be received from an external server, near the graphic object for selecting the particular information.

In an exemplary embodiment of the present disclosure, the graphic object for selecting the particular information may include at least one icon associated with a function related to the state information of the mobile terminal.

In an exemplary embodiment of the present disclosure, the state information of the mobile terminal, the particular information, and a plurality of graphic objects including the at least one information may be output on the display unit, and, in response to a preset type of touch applied to any one graphic object among the plurality of graphic objects, the control unit may process information included in the any one graphic object and information included in at least one graphic object different from the any one graphic object among the plurality of graphic objects in an associated manner.

In an exemplary embodiment of the present disclosure, the control unit may generate at least one additional information by processing the information included in the any one graphic object and the information included in the at least one graphic object different from the any one graphic object in an associated manner, display a graphic object including the at least one additional information on the display unit, and make the information included in the any one graphic object and the information included in the at least one graphic object different from the any one graphic object disappear from the display unit.

In an exemplary embodiment of the present disclosure, the at least one additional information may be information processed by associating information included in at least three graphic objects, and when a preset type of touch is applied to the at least one additional information, the control unit may process information represented by the at least one graphic object among the at least three graphic objects such that the information is not associated with the additional information, and display the information included in the at least one graphic object processed not to be associated on the display unit apart from the graphic object representing the additional information.

In an exemplary embodiment of the present disclosure, a plurality of icons representing functions that can interwork with the plurality of graphic objects may be output together with the plurality of graphic objects on the display unit, and in response to a preset type of touch applied to the any one graphic object, the control unit may cooperatively operate a function represented by any one icon among the plurality of icons and the information included in the any one graphic object.

In an exemplary embodiment of the present disclosure, when the function associated with the any one icon and the information included in the any one graphic object interwork, the control unit may change the information included in the any one graphic object into information indicating the interworking.

In an exemplary embodiment of the present disclosure, when the information included in the any one graphic object and the information included in the at least one graphic object are not processed in an associated manner, the control unit may output notification information indicating that the information included in the any one graphic object and the information included in the at least one graphic object are not processed in an associated manner, so that the user can recognize the same.

To achieve these and other advantages and in accordance with the purpose of this specification, as embodied and broadly described herein, a method for controlling a mobile terminal executing an information providing function for providing information by using a graphic object including information may include: sensing state information of the mobile terminal; selecting particular information according to a user's control command; when the particular information is selected, receiving at least one information related to the particular information among information stored in a preset external server and the state information of the mobile terminal; and outputting a graphic object including the at least one information received from the external server on a display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
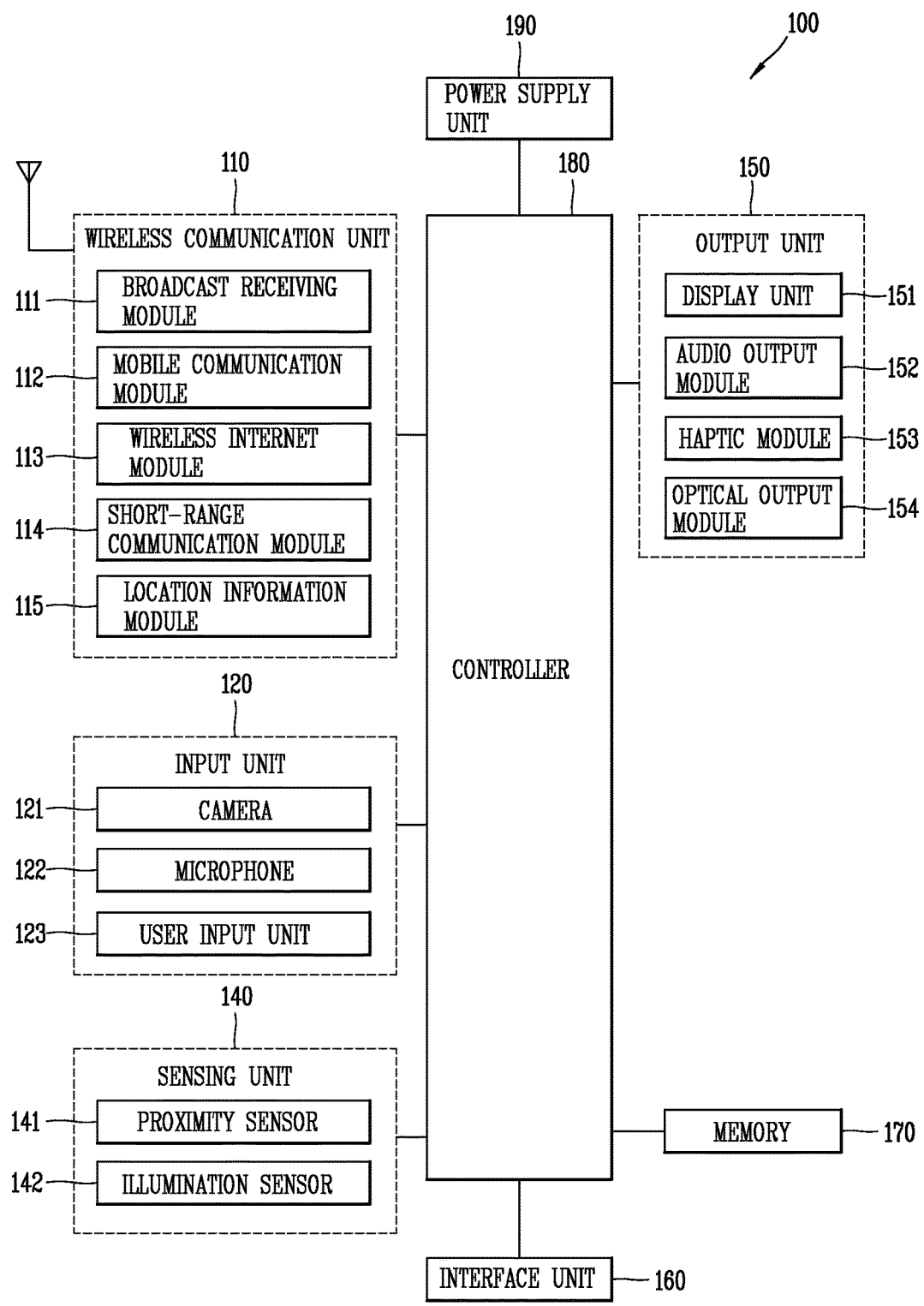
FIG. 1A is a block diagram of a mobile terminal according to an exemplary embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
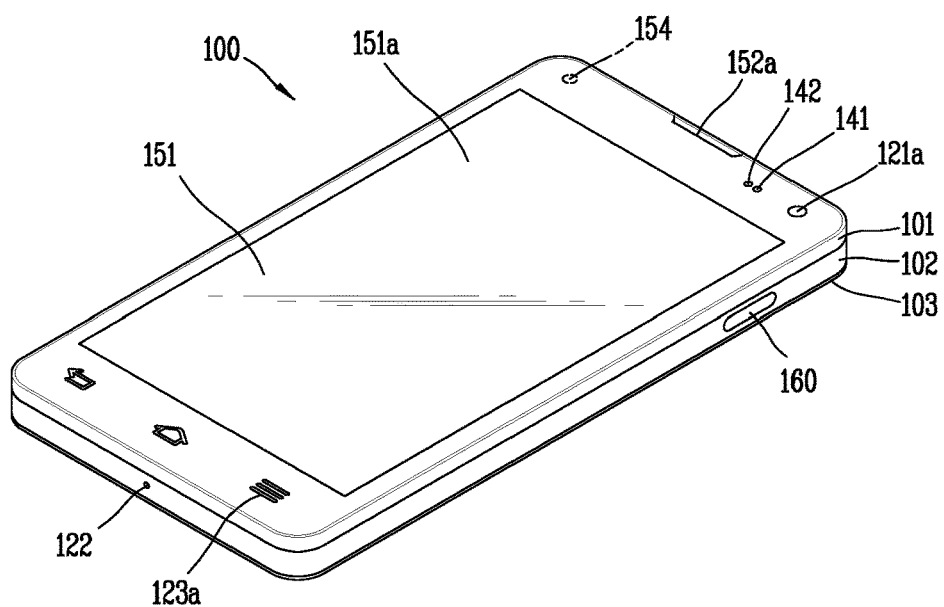
FIGS. 1B and 1C are conceptual views of one example of the mobile terminal, viewed from different directions.
Figure 1C:
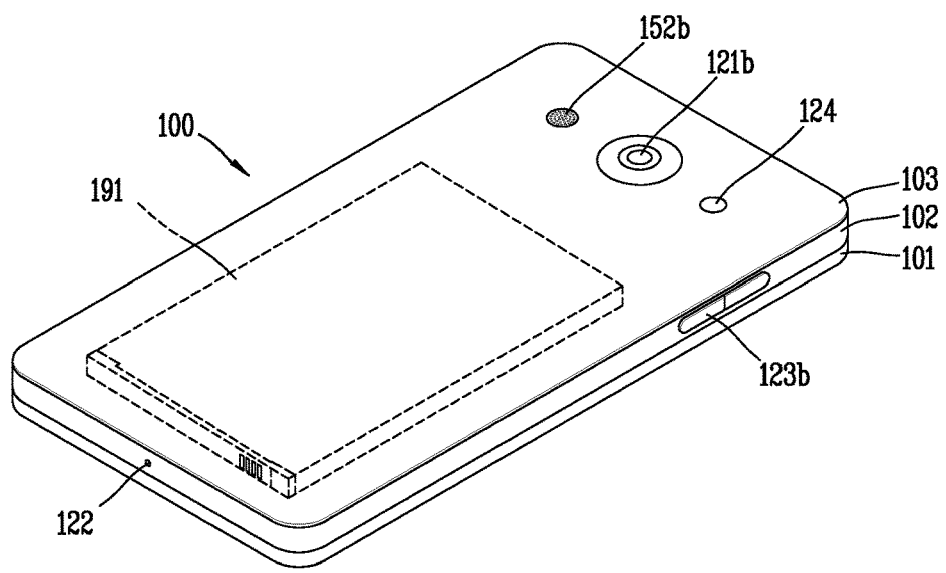

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Hereinafter, exemplary embodiments related to a control method that may be realized in the mobile terminal configured described above will be described with reference to the accompanying drawings. It will be obvious by a person skilled in the art that the present invention is embodied to any other forms without departing from the sprit and scope of the present invention. Also, in the following descriptions, drawings are described in order of clockwise direction, starting from the drawing in an upper portion on the left.

Meanwhile, according to the development of communication technologies, an external server may receive various types of information from a plurality of mobile terminal connected thereto. Also, the external server may store the various types of information received from the plurality of mobile terminals.

The external server may also be understood under the name of a "cloud server". In detail, the cloud server may be a server connected to a plurality of physical servers (or storage spaces) and storing information using at least a portion of the plurality of physical servers. Thus, the cloud server may flexibly utilize the storage space according to a user request.

Recently, how to utilize various types of information stored in an external server has been variously discussed. Various types of information stored in the external server may be referred to as "big data", and the big data is information such as SNS history information, location information, time information, date information, schedule information, and the like, of a user. In general, big data may refer to information having capacity of a tera byte (TB) to pera byte (PT) level.

Various types of information stored in the external server may be provided to the user in various forms. For example, on the basis of time information of the mobile terminal among the information stored in the external server, in the mobile terminal according to an exemplary embodiment of the present disclosure may selectively receive a portion of the information stored in the external server and output to a display unit to provide the information to the user.

Here, the information received from the external server may be provided through an application previously installed in the mobile terminal or may be provided through a function of the mobile terminal itself. Here, the application may be a program executed in the mobile terminal, and may be installed in advance when the mobile terminal is released from the factory, or may be downloaded from a server from which the application may be downloaded, according to a user selection, like Android market.

Also, the application may be controlled by the control unit 180 of the mobile terminal or may be controlled by a control unit provided in the application itself. In an exemplary embodiment of the present disclosure, a case in which the application is controlled by the control unit 180 of the mobile terminal will be described, but the application may also be controlled by the control unit provided in the application itself in the same manner.

Hereinafter, a method for providing various types of information to a user by using a graphic object in the mobile terminal according to an exemplary embodiment of the present disclosure will be described. FIGS. 2A, 2B, 2C, 2D, 2E, 2F, and 2G are conceptual views illustrating graphic objects including information in the mobile terminal related to an exemplary embodiment of the present disclosure.

The graphic object may be screen information including information displayed on the display unit 151. Also, the graphic object may have a quadrangular card form. The quadrangular card form of the graphic object may be variously modified. Also, each graphic object may include different information.

Also, the graphic object may be screen information including information displayed on the display unit 151. Also, the graphic object may have a quadrangular card shape. The quadrangular card shape may be variously modified. Also, each graphic object may include different information.

Also, the graphic object may be displayed on an execution screen of an application having a function of displaying a graphic object including information or may be output as a widget on a home screen page. For example, referring to the first drawing of FIG. 2A, the graphic object may provide information in the form of a widget 200 to the user. The home screen page is a standby screen of the mobile terminal and may include at least one icon and widget.

A plurality of home screen pages may be provided. Here, the control unit 180 may output any one of the plurality of home screen pages on the display unit 151. Also, in response to a preset type of touch, the control unit 180 may output a home screen page different from the anyone home screen page. Here, the plurality of home screen pages may include different icons and widgets.

The widget 200 is a sort of application program and may output a graphic object indicating simple information related to an application on a display unit 151. That is, without executing an application, the widget 200 may display information related to the application on a standby screen of the mobile terminal to provide the same to the user.

Also, using the widget 200, the control unit 180 may execute a function related to the widget 200. For example, referring to the second drawing of FIG. 2A, in response to a touch applied to the widget 200 including information, the control unit 180 may execute a function associated with the widget 200.

Figure 2A:
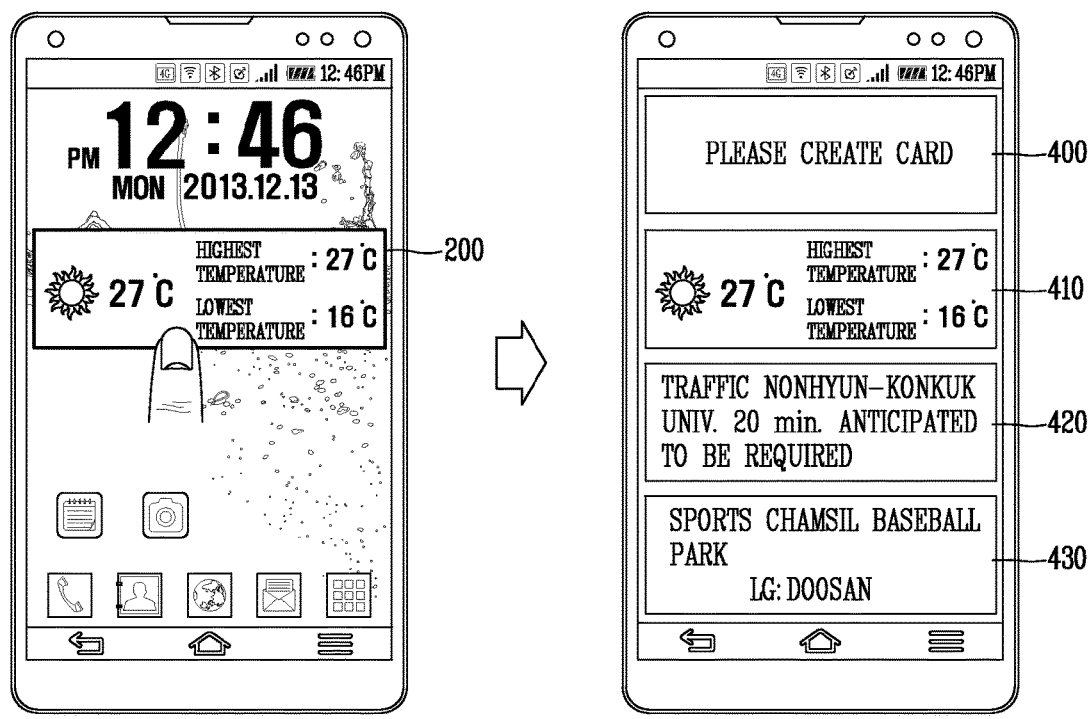
FIGS. 2A, 2B, 2C, 2D, 2E, 2F, and 2G are conceptual views illustrating graphic objects including information in the mobile terminal related to an exemplary embodiment of the present disclosure.

Also, an executed screen of the function associated with the widget 200 may be displayed on the display unit 151. For example, as illustrated in FIG. 2A, the function associated with the widget 200 may be a function to display at least one graphic object 400, 410, 420, or 430 including information. Here, the at least one graphic object 400, 410, 420, or 430 may include different information.

Also, the widget 200 may be output to the home screen page according to a user setting or may be output on the home screen page when preset conditions are met. The preset conditions may be conditions under which state information of the mobile terminal is identical to a preset state.

Figure 2B:
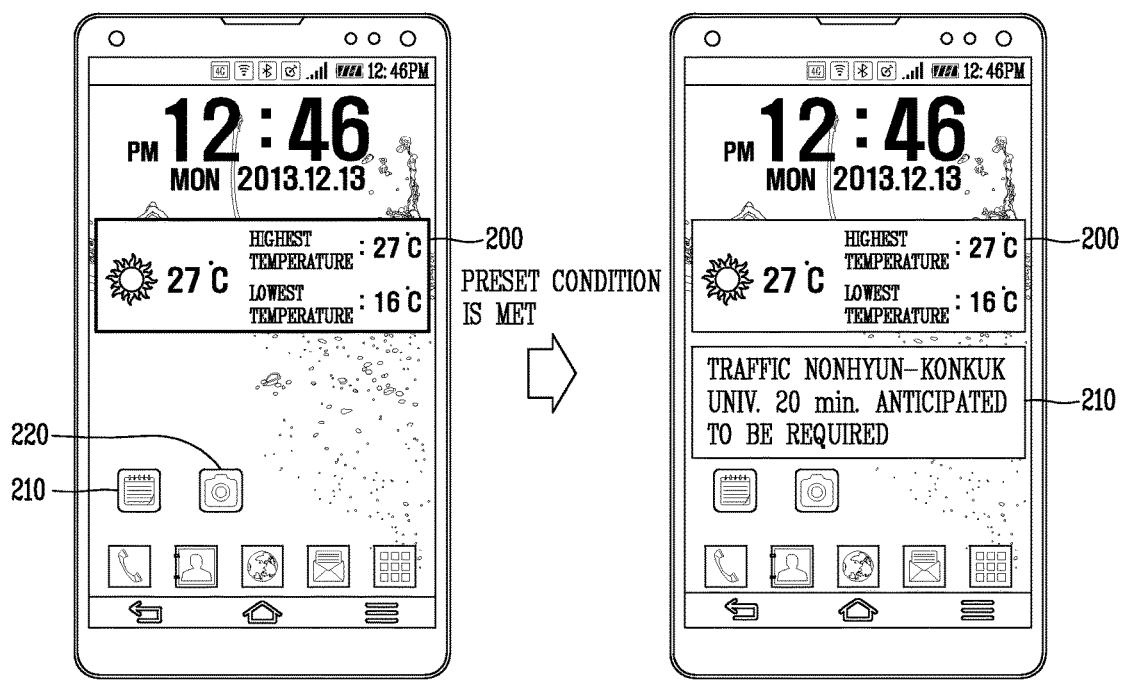

For example, referring to FIG. 2B, the control unit 180 may display a widget including public transportation information on the home screen page at rush hour (for example, 8:00 a.m.). Also, the control unit 180 may display a widget including nearby famous restaurants on the home screen page at lunch time (e.g., 12:00 p.m.). Accordingly, the user may be provided with his or her desired information without a separate setting.

Also, when an application indicating a function to display a graphic object including information is executed, the control unit 180 may display at least one graphic object 400, 410, 420, or 430 including at least partial information on an executed screen of an application. Here, the function to display a graphic object including information may be called an information providing function for the sake of convenience. The information providing function may be called various names by a person skilled in the art.

Here, when a touch is applied to any one graphic object 410 among the at least one graphic object 400, 410, 420, or 430, the control unit 180 may change a degree of output of information included in the any one graphic object 410. In detail, as illustrated in the first drawing of FIG. 2C, the control unit 180 may output information included in the at least one graphic object 400, 410, 420, or 430 to a first output degree. The first output degree may be understood as outputting the simplest summary information of information included in each of the graphic object 400, 410, 420, or 430.

Figure 2C:
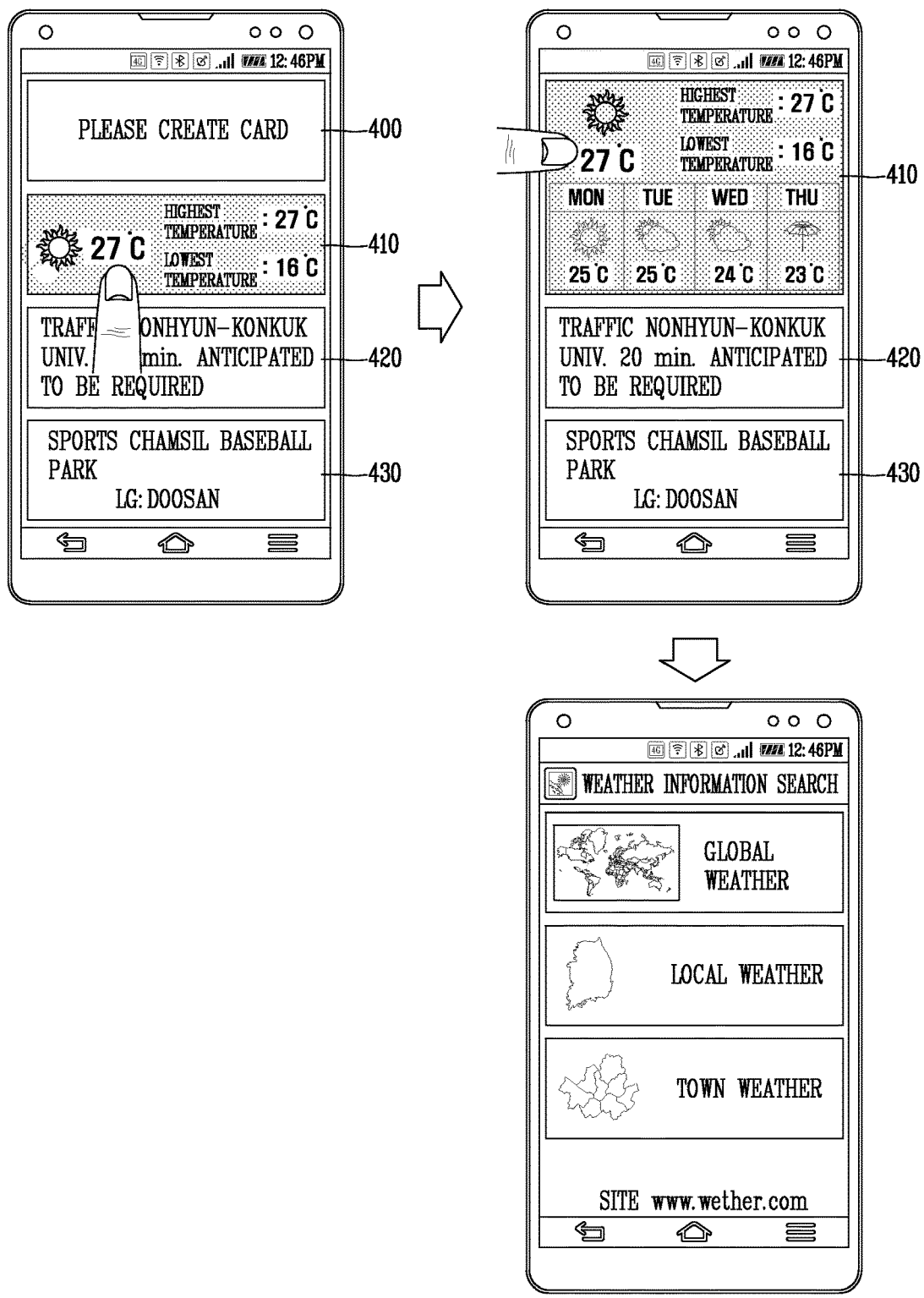

Here, as illustrated in the second drawing of FIG. 2C, when a touch is applied to any one graphic object among the at least one graphic object 400, 410, 420, or 430, the control unit 180 may output information included in the any one graphic object 410 to a second output degree. Here, the second output degree may be a degree to which more particular information is displayed, compared with the first output degree. Also, the control unit 180 may increase the size of the any one graphic object 410 such that information to the second output degree is displayed.

In addition, as illustrated in the third drawing of FIG. 2C, in a state in which any one graphic object 410 is output to the second output degree, when a touch is applied to the any one graphic object 410, the control unit 180 may output a graphic object included in the any one graphic object 410 to a third output degree. Here, the third output degree may be a degree to which every information included in the any one graphic object 410 is output. In this case, the entirety of information included in the any one graphic object may be displayed on the display unit 151.

In addition, although not shown, it may be natural to a person skilled in the art that an output degree of graphic object information is returned to a previous output degree through a user input unit (for example, a back key function) for canceling the currently executed function. In this manner, the user may appropriately adjust an output degree of information related to a graphic object by simply touching a graphic object.

In an exemplary embodiment of the present disclosure, information received from an external server is provided to the user through graphic objects in the form of card, thus providing information with high readability. Also, in an exemplary embodiment of the present disclosure, various functions may be provided by simply applying a touch to the graphic objects in the form of card.

Also, in a state in which a plurality of graphic objects including different information are output, when a preset type of touch is applied to any one among the plurality of graphic objects, the control unit 180 may execute a function related to the graphic object.

Figure 2D:
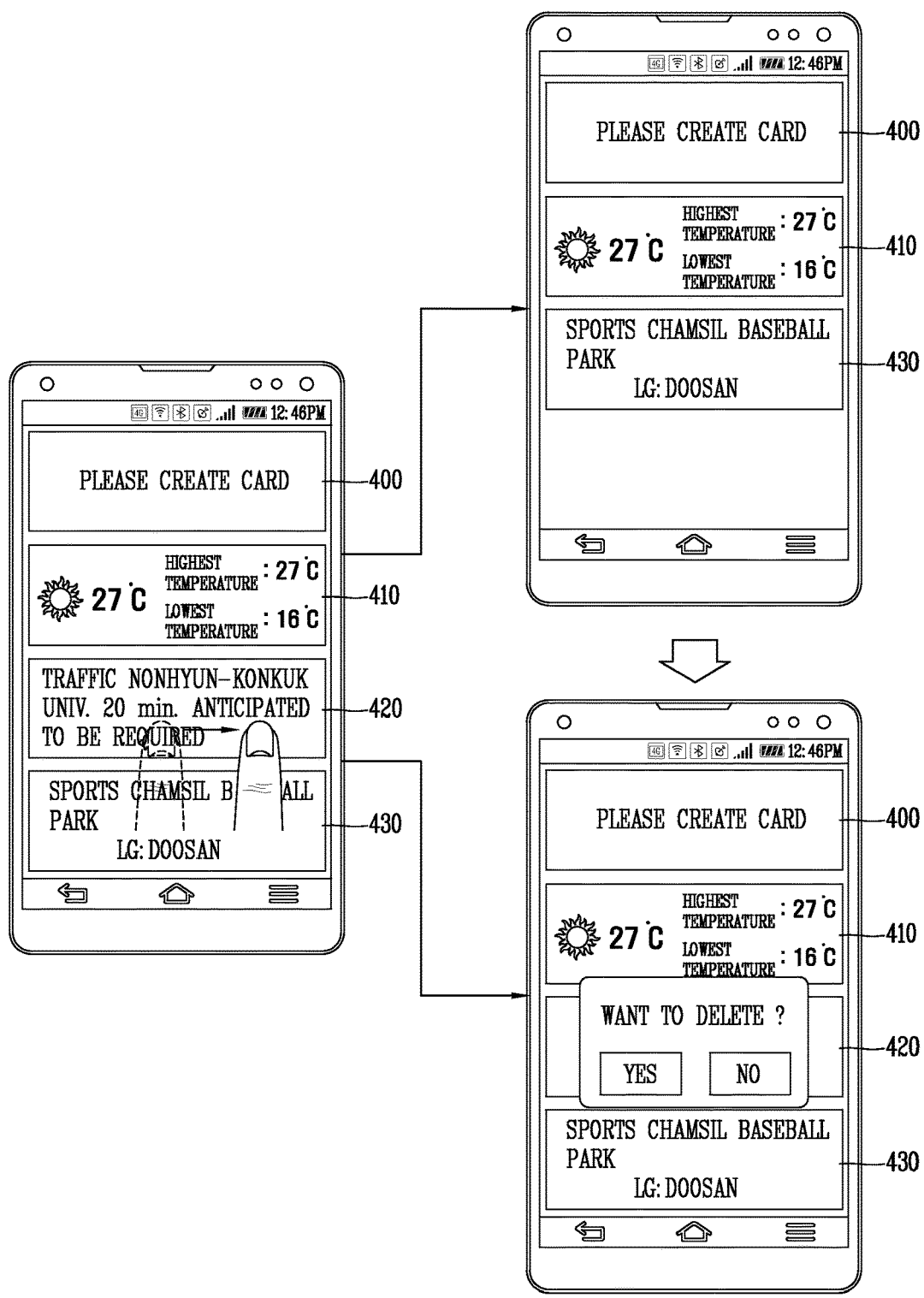
Figure 2E:
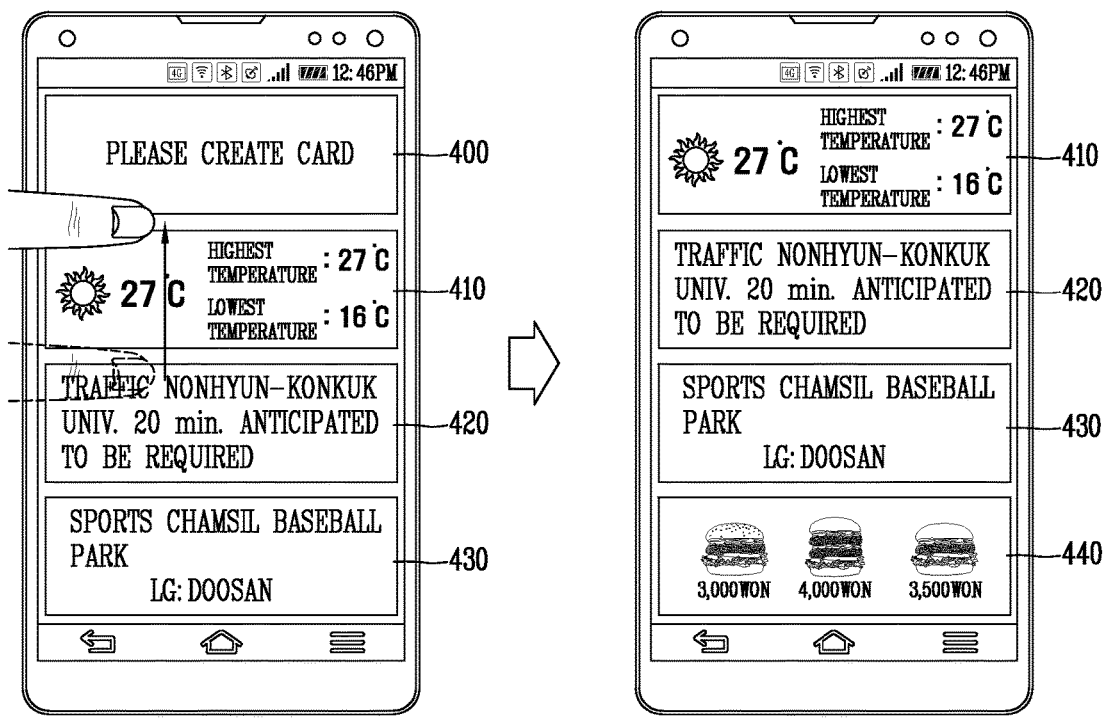

For example, referring to the upper drawing on the right in FIG. 2D, in a state in which a plurality of graphic objects 400, 410, 420, and 430 are output on the display unit 151, when a flicking input is applied to any one graphic object 420, the control unit 180 may make the any one graphic object 420 disappear from the display unit 151.

In another example, referring to the lower drawing on the right in FIG. 2D, in response to a flicking input applied to any one graphic object 420, the control unit 180 may output a pop-up window inquiring as to whether to make the any one graphic object 420 disappear from the display unit 151. In this case, the user may select whether to make the any one graphic object disappear from the display unit 151 by using the pop-up window.

Also, in a state in which a plurality of graphic objects including information are output on the display unit 151, the control unit 180 may execute a scroll function in response to a touch applied in a preset direction. For example, referring to FIG. 2E, when a drag input applied in an upward direction with respect to the plurality of graphic objects 400, 410, 420, and 430 is sensed, the control unit 180 may make at least a portion 400 disappear from the display unit 151. When the at least portion 400 disappears, the control unit 180 may output a graphic object 440, which has not been output on the display unit 151, to the display unit 151.

Figure 2F:
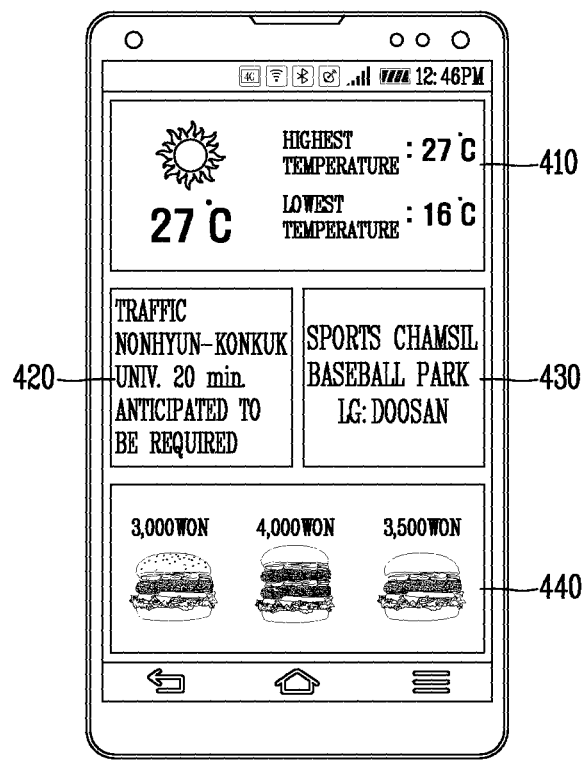
Figure 2G:
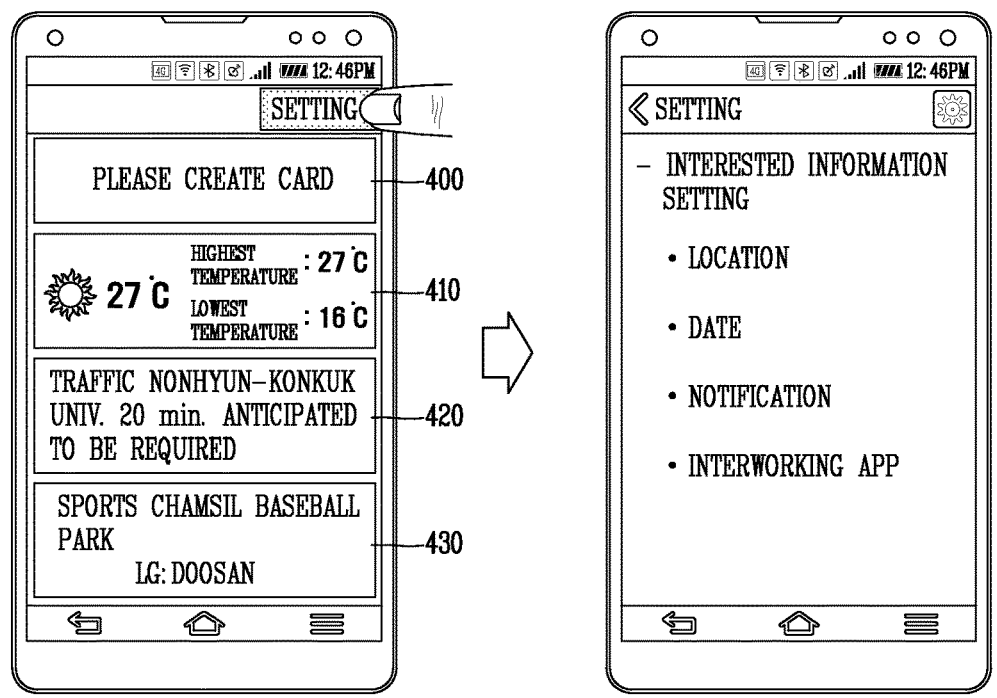

Also, the control unit 180 may output the plurality of graphic objects 400, 410, 420, and 430 having different sizes on the basis of a preset reference. The preset reference may be set by the user. For example, the preset reference may be a reference related to a least any one among a usage frequency and position of a function associated with a graphic object. In detail, when it is determined that the mobile terminal is located in a preset location, the control unit 180 may output a graphic object related to the location such that a size of the graphic object related to the location is greater than those of other graphic objects. For example, as illustrated in FIG. 2F, the control unit 180 may output a plurality of graphic objects 400, 410, 420, and 430 having different sizes on a basis of preset conditions.

Also, in an exemplary embodiment, types of information to be included in a graphic object may be received from the user. For example, referring to the first drawing of FIG. 2G, a setting icon for the user to select a type of information may be displayed in a region of the display unit 151. Also, referring to the second drawing of FIG. 2G, when the setting icon is selected, the control unit 180 may output a setting screen for selecting types of information on the display unit 151.

In an exemplary embodiment of the present disclosure, in addition to the contents described above, various functions related to graphic objects including information may be executed. Graphic objects including information described hereinafter may include all of the functions described above.

Hereinafter, a method for setting and providing information to be included in a graphic object will be described with reference to the accompanying drawings.

Figure 3:
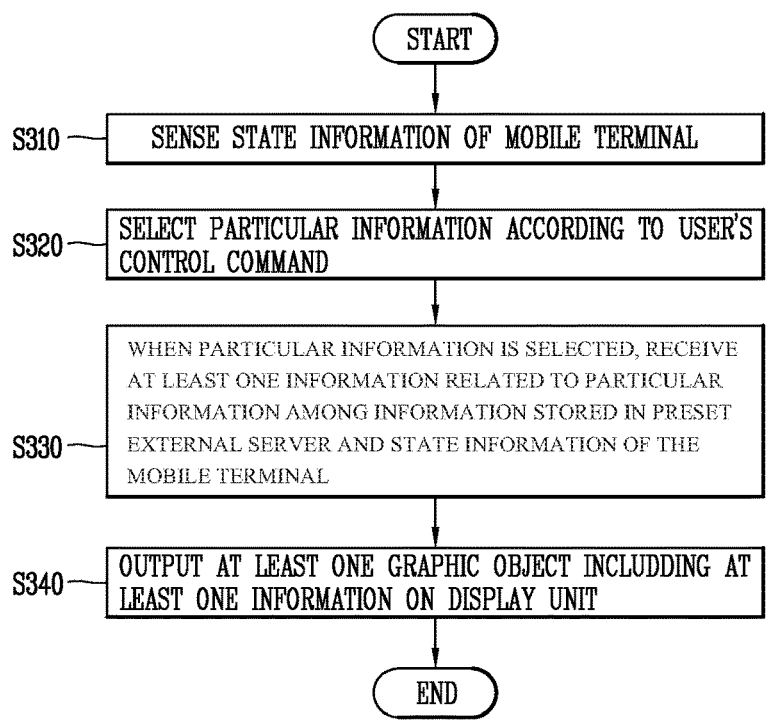
FIG. 3 is a flow chart illustrating a control method of receiving at least one information from an external server by using state information of a mobile terminal and an information set by a user's control command, in the mobile terminal related to an exemplary embodiment of the present disclosure.

FIG. 3 is a flow chart illustrating a control method for receiving at least one information from an external server by using state information of a mobile terminal and information set according to a user's control command in the mobile terminal related to the present disclosure, and FIGS. 4A, 4B, 4C, 4D, and 4E are conceptual views illustrating the control method of FIG. 3, in the mobile terminal related to an exemplary embodiment of the present disclosure.

The mobile terminal according to an exemplary embodiment of the present disclosure may sense state information of the mobile terminal in step S310.

The mobile terminal according to an exemplary embodiment of the present disclosure may output at least one graphic object including information on the display unit 151. The at least one graphic object may include at least one among state information of the mobile terminal and information selected according to a user's control command.

The state information of the mobile terminal may be information sensed through a sensor provided in the mobile terminal and information related to a state of the mobile terminal itself.

In detail, the mobile terminal may include a position sensor (for example, a GPS sensor) for sensing a location of the mobile terminal, a position sensor (e.g., a gyro sensor) for sensing a degree of tilt of the mobile terminal, and the like. Here, the state information of the mobile terminal may include the current location information of the mobile terminal, posture information of the terminal body of the mobile terminal, and the like. Also, the state information of the mobile terminal may include information of an application installed in the mobile terminal, capacity information of a memory unit of the mobile terminal, information of an application being currently executed in the mobile terminal, really simple syndication (RSS) information, information related to usage aspect of the mobile terminal, schedule management information, Web side search history information, set value information previously set by the user and the like. Here, the RSS information may refer to an XML-based content created in order to easily provide information regarding a Web side to the user.

Also, in the mobile terminal according to a exemplary embodiment of the present disclosure, particular information may be selected by a user's control command in step S320.

In the mobile terminal according to a exemplary embodiment of the present disclosure, in a state in which at least one graphic object including information is output on the display unit 151, particular information may be selected according to a user's control command. The particular information may be information received through a sensor of the mobile terminal, information related to a function being executed in the mobile terminal, information stored in the memory unit of the mobile terminal, information input through the user input unit, and the like. In detail, the particular information may be image information received by using a camera, image information stored in a memory unit, execution screen information of an application, information of application being currently executed, and the like.

Also the user's control command may be received in various input manners such as a touch input, a voice input, a gesture input, and the like.

Figure 4A:
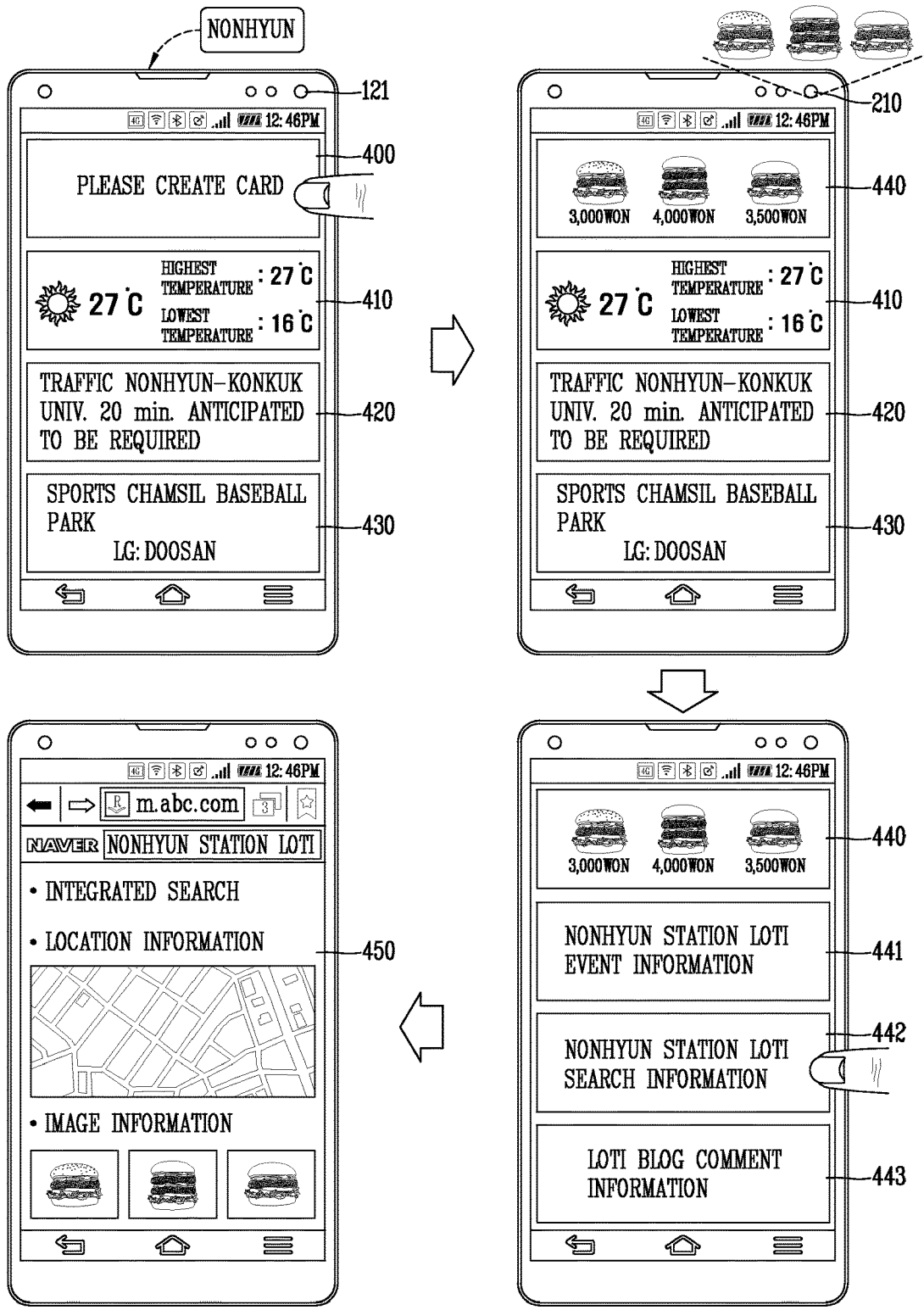
FIGS. 4A, 4B, 4C, 4D, and 4E are conceptual views illustrating the control method of FIG. 3, in the mobile terminal related to an exemplary embodiment of the present disclosure.

Meanwhile, a graphic object 400 indicating a function to selectively receive particular information according to a user's control command may be output on the display unit 151. For example, as illustrated in FIG. 4A, the control unit 180 may output a graphic object 400 for selecting particular information according to a user's control command on a region of the display unit 151.

The graphic object 400 for selecting particular information according to a user's control command may be output according to a user's request or may be output on a region of at least one graphic object including information all the time.

Here, the control unit 180 may receive particular information by using the graphic object 400 for selecting particular information according to a user's control command. For example, as illustrated in FIG. 4A, when a touch applied to the graphic object 400 for selecting particular information according to the user's control command is sensed, the controller 180 may receive an image from the camera 121. Here, the controller 180 may select the image received from the camera 121 as particular information according to the user's control command.

In another example, in response to a touch applied to the graphic object 400 for selecting particular information according to a user's control command, the controller 180 may execute a preset application. Here, the control unit 180 may select information related to the executed application, as particular information on the basis of the user's control command.

Also, when the particular information is selected, the control unit 180 may include the particular information in the graphic object for selecting the particular information. For example, as illustrated in FIG. 4A, a graphic object 440 including the particular information may be displayed on the display unit 151.

Meanwhile, the step S310 and the step S320 may be simultaneously performed, or separately performed, or the step S320 may be performed before the step S310 regardless of order.

When the particular information is selected, the mobile terminal according to an exemplary embodiment of the present disclosure may receive at least one information, among information stored in a preset external server of the mobile terminal, related to the particular information and state information of the mobile terminal according to an exemplary embodiment of the present disclosure in step S330.

The present external server may be an external storing a plurality of information as described above.

Here, when the particular information is selected by a user's control command, the mobile terminal according to an exemplary embodiment of the present disclosure may receive at least one information among the information stored in the external server on the basis of the state information of the mobile terminal and the selected particular information.

Here, the at least one information may be information related to the particular information and the state information of the mobile terminal. For example, when the particular information is an image of a coffee cup and the state information of the mobile terminal is "Nonhyun area", at least one information related to a coffee shop located in the Nonhyun area may be received from the external server.

When the at least one information is received from the external server, the mobile terminal according to an exemplary embodiment of the present disclosure may output at least one graphic object including the at least one information on the display unit in step S340.

When the at least one information is received, the control unit 180 may output the graphic object including the at least one information on the display unit 151. Here, the at least one graphic object including the at least one information may be output to a region adjacent to a region in which the graphic object including the particular information is output. Accordingly, the user may know that the information included in the at least one graphic object is information related to the particular information.

Here, the at least one graphic object may be output on a region of a home screen page, or may be output on an execution screen of a particular application. Here, the particular application may be an application including a function to output the graphic object including the information.

Also, the at least one graphic object may disappear from the display unit 151 according to a user selection, and when a preset condition is met, the at least one graphic object may automatically disappear. For example, when a preset output time has lapsed, the at least one graphic object may disappear from the display unit 151.

Also, the at least one graphic object may be associated with a function related to the at least one information. For example, the function related to the at least one information may be a function to search for the at least one information from a web. That is, the user may easily access the function associated with the at least one information by using the at least one graphic object.

Also, the at least one graphic object may have various forms. For example, the at least one graphic object may have a card form. In this case, the user may be provided with a card-type graphic object including information.

Hereinafter, the control method described above will be described in more detail with reference to the accompanying drawings.

For example, referring to a first drawing of FIG. 4A, the control unit 180 may sense a touch applied to the graphic object 400 representing a function to select particular information. Here, the control unit 180 may execute the function to select the particular information. For example, the control unit 180 may execute a camera function to select the particular information.

Thereafter, referring to a second drawing of FIG. 4A, the control unit 180 may select an image received from the camera 121, as particular information. Here, the control unit 180 may output a graphic object 440 including the image received from the camera 121 on the display unit 151.

Also, the graphic object 440 including the image received from the camera may be output on the region in which the graphic object 400 representing the function to select the particular information is displayed.

Here, referring to a third drawing of FIG. 4A, the control unit 180 may output at least one graphic object 441, 442, and 443 including at least one information on the display unit 151 on the basis of the particular information and the state information of the mobile terminal.

Here, the at least one graphic object 441, 442, and 443 may be output in a nearby region of the region in which the graphic object 440 including the particular information is output. In this case, at least some of the other graphic objects 410, 420, and 430 which have been output may disappear from the display unit 151. In addition, the at least one graphic object 441, 442, and 443 may be associated with a function related to information included in the at least one graphic object 441, 442, and 443. Here, when any one graphic object 442 among the at least one graphic object 441, 442, and 443 is selected, the control unit 180 may execute a function associated with the selected any one graphic object 442. For example, referring to the third drawing of FIG. 4A, the control unit 180 may sense a touch applied to any one graphic object 442 among the at least one graphic object 441, 442, and 443.

Here, in response to the touch applied to the any one graphic object 442, the control unit 180 may execute a function associated with the any one graphic object 442. For example, referring to a fourth drawing of FIG. 4A, in a case in which the function associated with the any one graphic object 442 is a search function through a Web, information related to the particular information may be searched through a Web in response to the touch applied to the any one graphic object 442, and an execution screen 450 displaying the search result may be output on the display unit 151.

Meanwhile, when different types of touches are applied to a graphic object including information, the control unit 180 may execute different functions related to the graphic object. For example, when a first type of touch is applied to a graphic object, the control unit 180 may execute a first function related to the graphic object, and when a second type of touch is applied to the graphic object, the control unit 180 may execute a second function related to the graphic object. As the touch types, various touch types such as a short touch, a long touch, a drag touch, a multi-touch, and the like, may be applied.

For example, when a short touch (a first touch) is applied to the graphic object 440 including the particular information, the control unit 180 may execute a function (a first function) related to the particular information. In another example, as illustrated in FIG. 4B, when a drag touch (a second touch) is applied to the graphic object 440 including the particular information in a preset direction, the control unit 180 may execute a function (a second function) to make the particular information disappear from the graphic object 440.

Figure 4B:
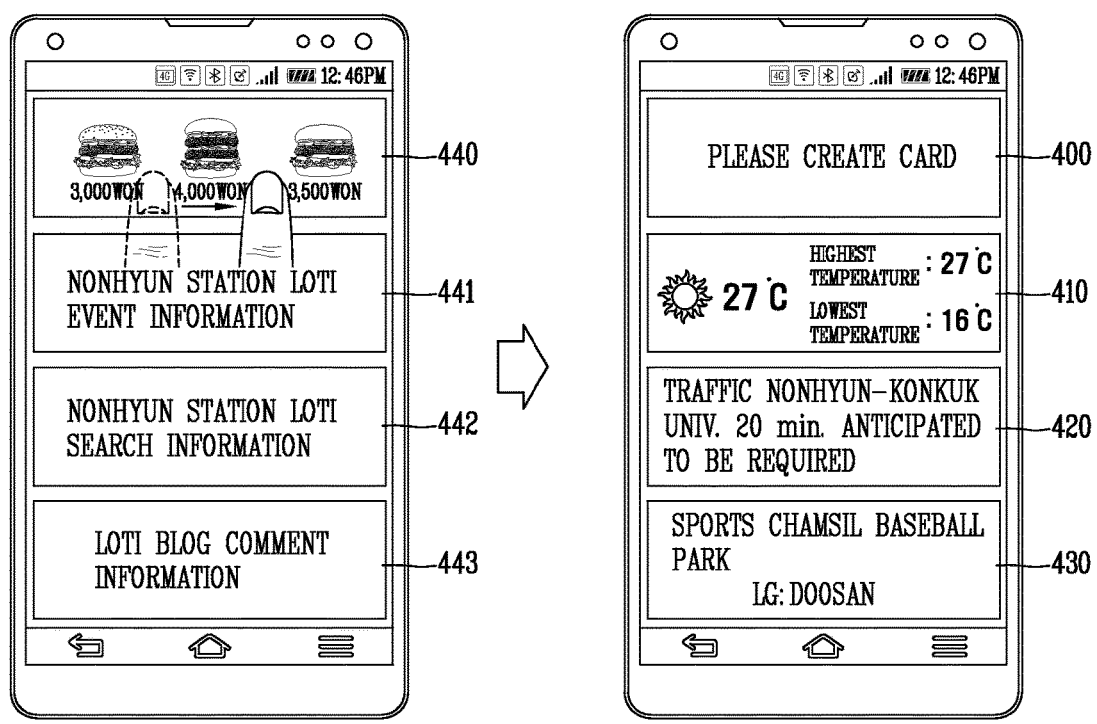

Here, as illustrated in FIG. 4B, when the particular information disappears from the display unit 151, the control unit 180 may make the at least one graphic object 441, 442, and 443 including information related to the particular information disappear from the display unit 151.

Also, a graphic object for selecting particular information may be output on the display unit 151 all the time, or may be output according to a user request.

Figure 4C:
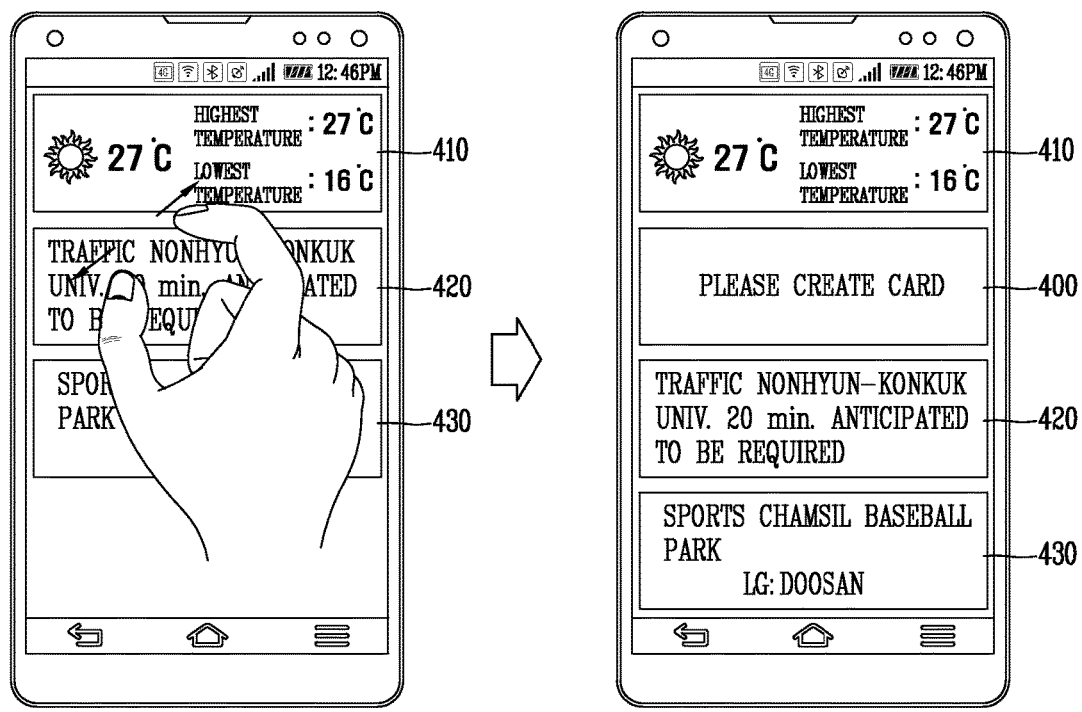

For example, as illustrated in FIG. 4C, in a state in which at least one graphic objects 410, 420, and 430 are output on the display unit 151, when a pinch-in touch is applied to the display unit 151, the control unit 180 may display a graphic object 400 for selecting particular information on the display unit 151.

Figure 4D:
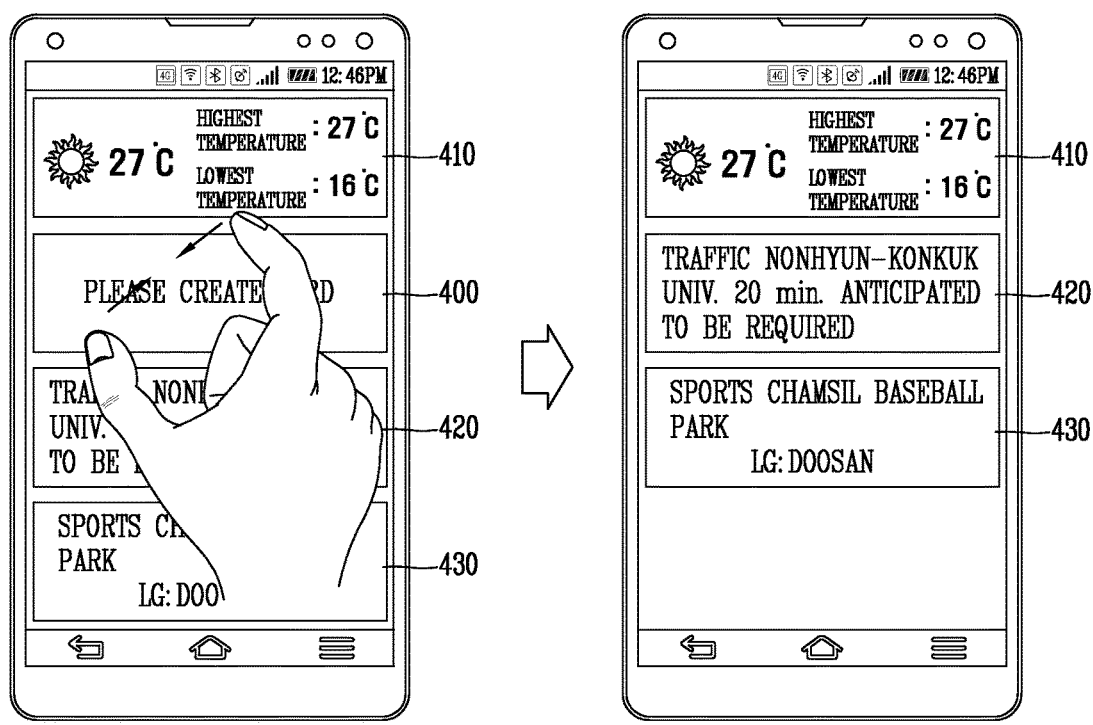

Also, as illustrated in FIG. 4D, in a state in which the graphic object 400 for selecting particular information is output on the display unit 151, when a pinch-out touch is applied to the display unit 151, the control unit 180 may make the graphic object 400 for selecting particular information disappear from the display unit 151.

Also, an output position of the graphic object 400 for selecting particular information may be fixed or may not be fixed. For example, the graphic object 400 for selecting particular information may be fixedly output to an upper end portion or a lower end portion of the display unit 151. In another example, the graphic object 400 for selecting the particular information may be output on the region in which the pinch-in touch has been sensed.

In addition, when at least one of the particular information and state information is changed, the control unit 180 may not output at least one information received from the external server on the display unit 151.

Meanwhile, the control unit 180 may receive at least one information from the external server again on the basis of changed information of at least one of the particular information and state information. In this case, the control unit may output the received at least one information again on the display unit 151.

Figure 4E:
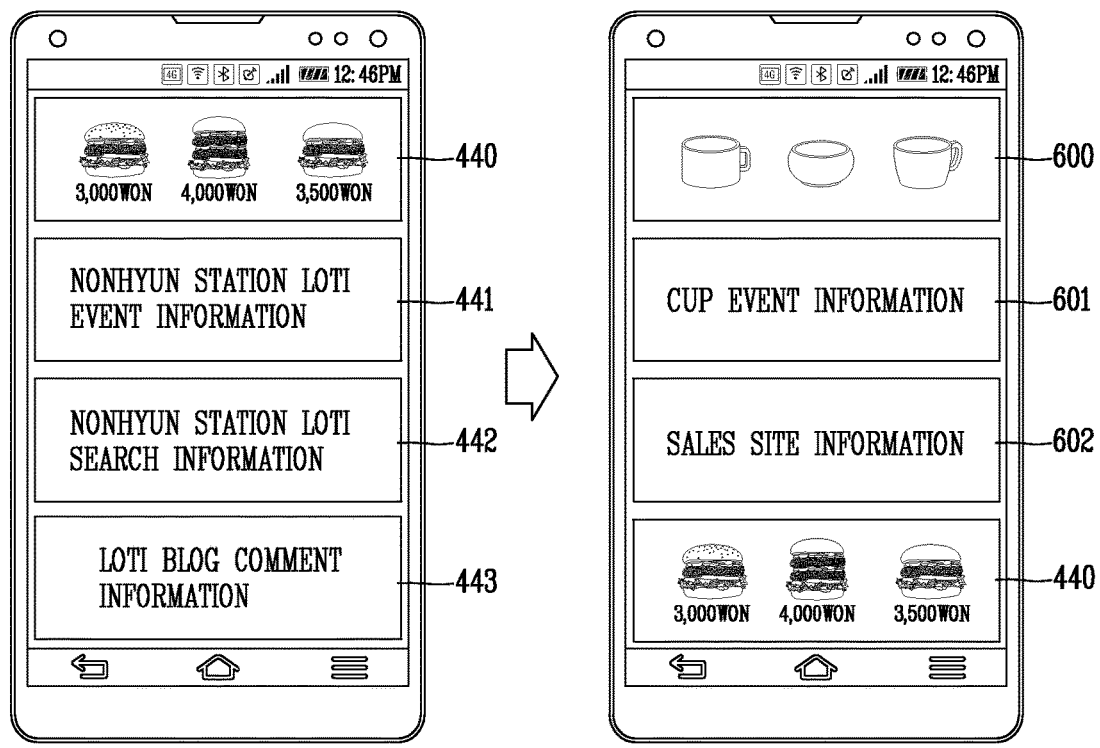

For example, as illustrated in FIG. 4E, in a state in which the graphic object 440 including first information selected by the user and the information items 441, 442, and 443 related to the first information are output, when the first information is changed to second information, the control unit 180 may make the information items 441, 442, and 443 disappear from the display unit 151. Here, on the basis of a graphic object 600 including the second information and state information of the second information, the control unit 180 may output at least one graphic object 601 and 602 including information newly received from the external server on the display unit 151.

In the above, the method for receiving at least one information from the external server and providing the received at least one information to the user on the basis of particular information selected by the user and state information of the mobile terminal has been described.

Accordingly, in an exemplary embodiment of the present disclosure, as well as providing state information of the mobile terminal, related information may be received from the external server by using information selected by the user and the state information to thereby provide information required for a current situation of the user. Also, since information related to information selected by the user is provided, customized information may be provided.

Hereinafter, a method for selecting particular information according to a user's control command will be described in detail.

Figure 5A:
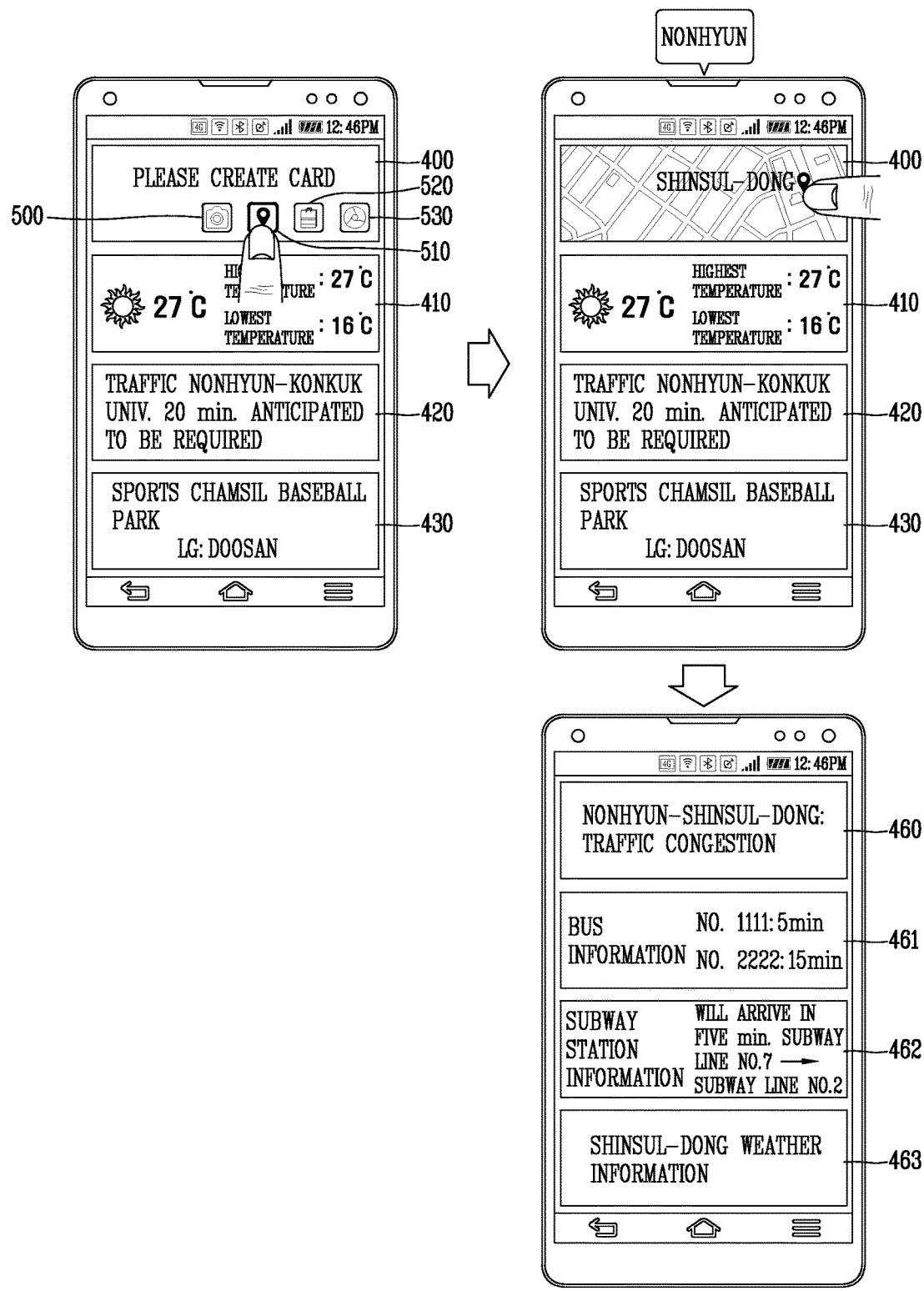
FIGS. 5A, 5B, and 5C are conceptual views illustrating a method of setting particular information by a user, in the mobile terminal related to an exemplary embodiment of the present disclosure.
Figure 5B:
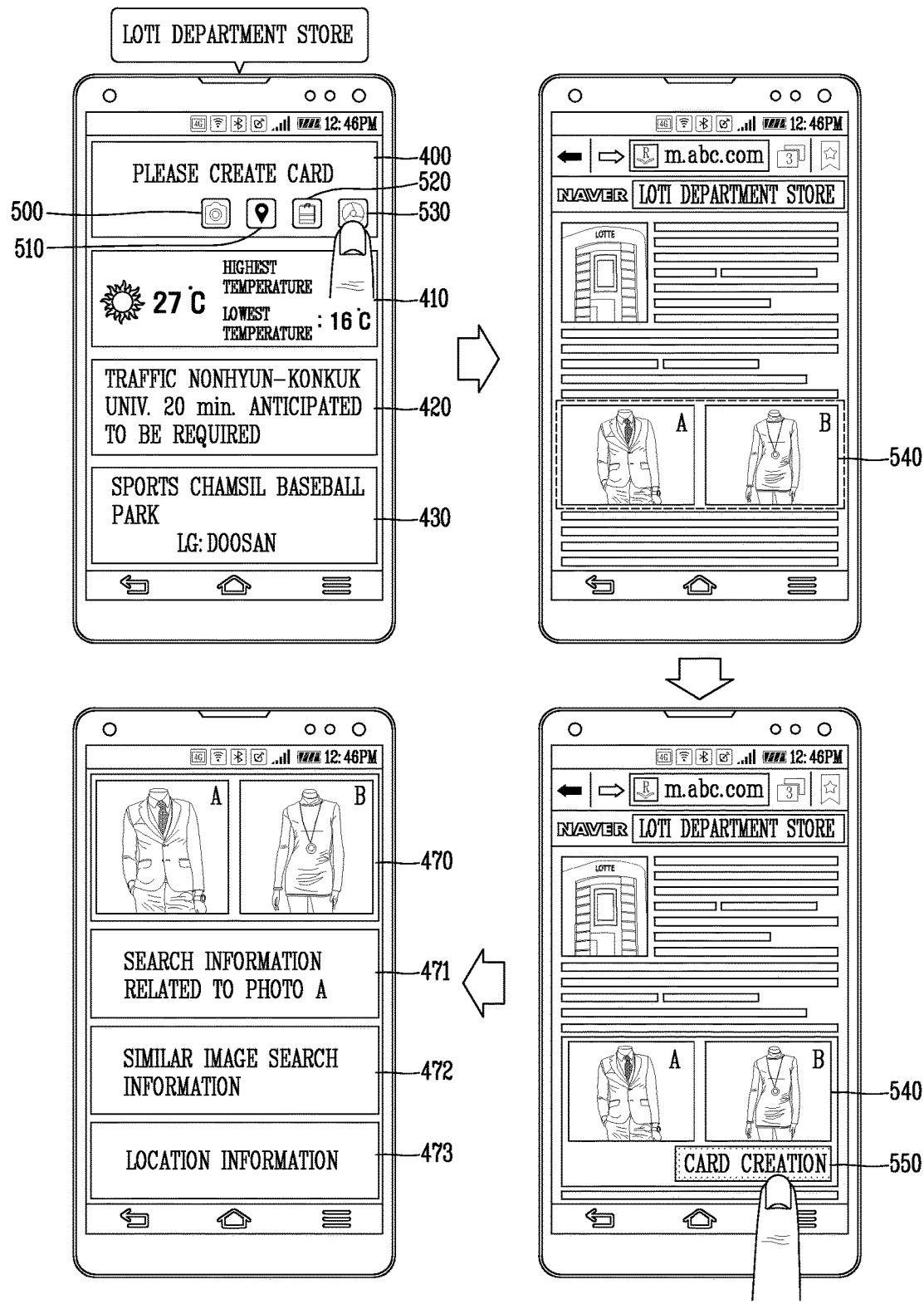
Figure 5C:
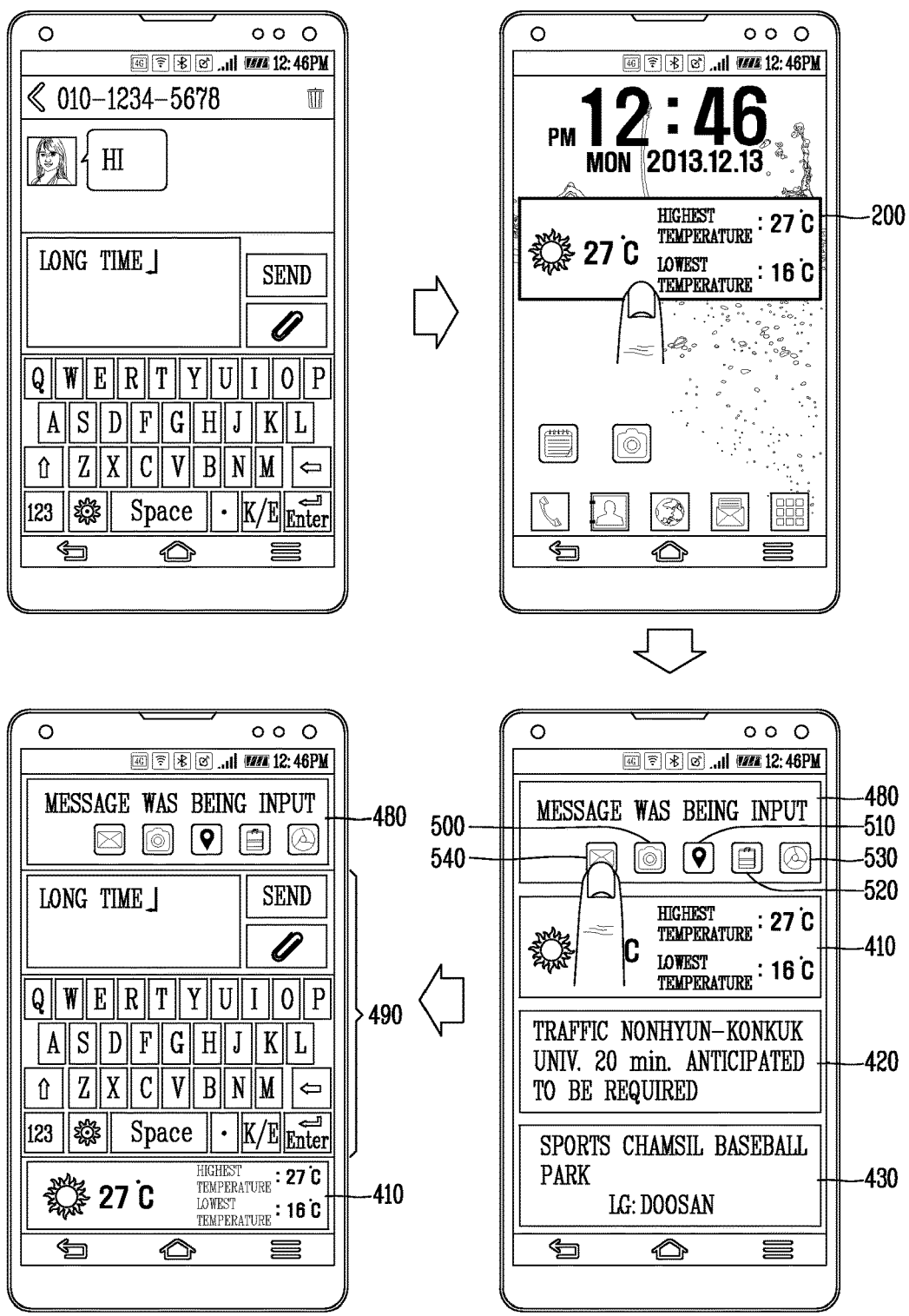

FIGS. 5A, 5B, and 5C are conceptual views illustrating a method of selecting particular information according to a user's control command, in the mobile terminal related to an exemplary embodiment of the present disclosure.

The mobile terminal according to an exemplary embodiment of the present disclosure may select particular information according to a user's control command, receive at least one information from an external server on the basis of the particular information and state information of the mobile terminal, and provide the same to the user.

Here, the control unit may provide a function to select particular information through various methods.

In detail, as illustrated in a first drawing of FIG. 5A, the control unit 180 may output a graphic object 400 for selecting the particular information on the display unit 400. Here, the graphic object 400 for selecting the particular information may include at least one icon 500, 510, 520, and 530 representing functions for selecting particular information.

For example, the icons may include an icon 500 related to a camera function, an icon 510 representing a function related to location information, an icon 520 representing a function related to schedule information, and an icon 530 representing a Web browser.

The icons 500, 510, 520, and 530 included in the graphic object 400 for selecting particular information may be an icon representing a function related to state information of the mobile terminal or an icon representing a preset function regardless of state information of the mobile terminal.

When any one of the at least one icon is selected, the control unit 180 may execute a function represented by the any one icon. Here, an execution screen of the function represented by the any one icon 510 may be display in the entire output region of the display unit 151 or displayed on the graphic object 500 for selecting particular information. For example, as illustrated in a second drawing of FIG. 5A, in a case in which the any one icon 510 represents a function related to location information, the control unit 180 may display an execution screen displaying the function related to the location information on the graphic object 400 for selecting particular information.

Here, the control unit 180 may select particular information by a touch applied to the executed screen output on the graphic object 400 for selecting the particular information. For example, in a state in which the execution screen of the function related to location information is output on the graphic object 400 for selecting particular information, when a touch is applied to a particular region, the control unit 180 may select location information represented by the particular region, as particular information.

When the location information represented by the particular region is selected as particular information, the control unit 180 may receive at least one information from the external server on the basis of the selected particular information and the state information of the mobile terminal.

For example, when a particular location is selected as particular information according to a user's control command, the control unit 180 may receive information regarding transportation means from the current location of the mobile terminal to the selected location from the external server on the basis of the current location information of the mobile terminal and the selected location. For example, as illustrated in a third drawing of FIG. 5A, the control unit 180 may receive at least one transportation means information from the external server on the basis of the current location and the location information selected by the user's command control, and display the received at least one transportation means information on the display unit 151. Here, each of the at least one transportation means information may be included in at least one graphic object 461, 462, and 463.

In another example, when the icon 530 representing a web browser function, among the at least one icon 500, 510, 520, and 530, is selected by the user, the control unit 180 may output an execution screen of the Web browser function on the display unit 151. Here, the control unit 180 may execute the Web browser function on the basis of state information of the mobile terminal. For example, as illustrated in (a) of FIG. 5B, in a case in which the mobile terminal is currently located in a "Lodi department store", the control unit 180 may search for information related to "Lodi department store" by using the Web browser function.

Thereafter, as illustrated in a second drawing of FIG. 5B, in a state in which the execution screen of the Web browser function is displayed, the control unit 180 may sense that a drag touch surrounding at least one region 540 of the Web browser execution screen is applied. Here, the control unit 180 may select the screen information generated by the drag touch and displayed in the at least one region 540, as particular information.

In this case, the control unit 180 may immediately select the screen information displayed in the at least one region 540, as particular information, or the user may determine whether to select the screen information displayed in the at least one region 540, as particular information. Here, when a touch is applied to the at least one region 540, the control unit 180 may output a graphic object inquiring as to whether the screen information displayed in the at least one region 540 is to be selected as particular information. For example, as illustrated in a third drawing of FIG. 5B, the control unit 180 may output a graphic object 550 inquiring as to whether the screen information displayed in the at least one region 540 is to be selected as particular information, on a nearby region of the at least one region 540.

Here, when the graphic object 550 inquiring as to whether the screen information displayed in the at least one region 540 is to be selected as particular information is selected, the control unit 180 may select the screen information displayed in the at least one region 540, as particular information, and receive at least one information from the external server on the basis of the particular information and the state information of the mobile terminal.

Here, on the display unit 151, the graphic object 470 including the particular information and at least one graphic object 471, 472, and 473 including the at least one information may be output. The at least one information may be information related to the particular information and state information of the mobile terminal. For example, when the particular information is image information, the at least one information may be search information related to the image.

Also, in an exemplary embodiment of the present disclosure, a graphic object including usage history information of applications installed in the mobile terminal may be output. The usage history information of an application may be information related to execution history of the application such as the number of times of executing the application, whether the application is being executed, whether there is an incomplete task (for example, whether there is an incomplete message), and the like. For example, in case of a message application, the usage history information may include whether there is a message which has not been completely created, whether there is a message whose reception has been held, whether the message application is being currently executed, and the like.

For example, as illustrated in a first drawing of FIG. 5C, the user may not complete creation of a message. Here, the control unit 180 may include information indicating that message creation has not been completed, in usage history information of the message application. Here, as illustrated in a second drawing of FIG. 5C, the control unit 180 may output a graphic object including the information indicating that the message creation has not been completed on one region of the display unit 151.

In addition, the control unit 180 may output an icon representing a function related to the usage history information on the graphic object representing the usage history information. For example, as illustrated in the third drawing of FIG. 5C, in a case in which the usage history information is a function related to an incomplete message, the control unit 180 may output a graphic object 480 representing a function related to message creation.

Here, as illustrated in a fourth drawing of FIG. 5C, in response to a touch applied to an icon 540 representing an application related to the message, the control unit 180 may output an execution screen of the application related to the message on one region of the display unit 151.

Accordingly, the user may recognize that a message is being created, even though other application is executed while the message is being created. In addition, in an exemplary embodiment of the present disclosure, by providing an execution screen of the application related to the message on one region of the execution screen of other application, creation of the message which is being created may be completed.

That is, in an exemplary embodiment of the present disclosure, when the user simultaneously uses a plurality of functions through multi-tasking, the user may recognize functions being executed, through graphic objects.

In the above, the method for selecting particular information according to a user's control command has been described. Hereinafter, a method for outputting a graphic object including particular information on a home screen page will be described.

Figure 6A:
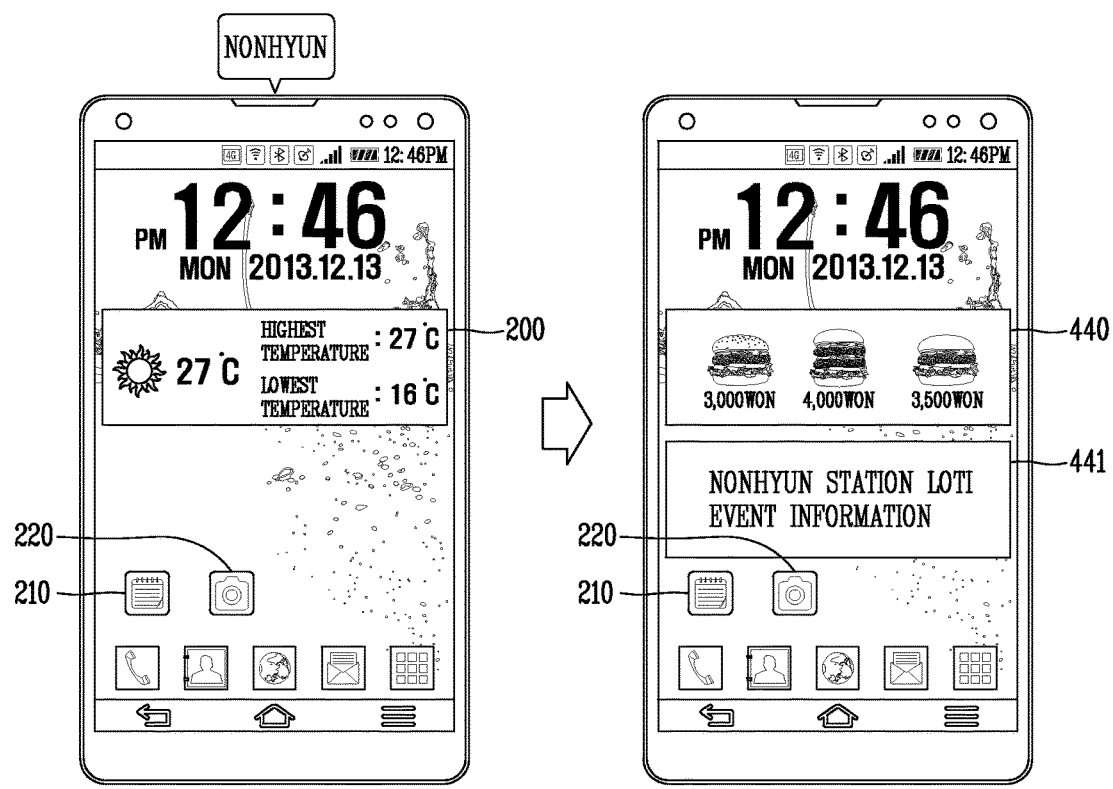
FIGS. 6A and 6B are conceptual views illustrating a method of outputting a graphic object including particular information on a home screen page.
Figure 6B:
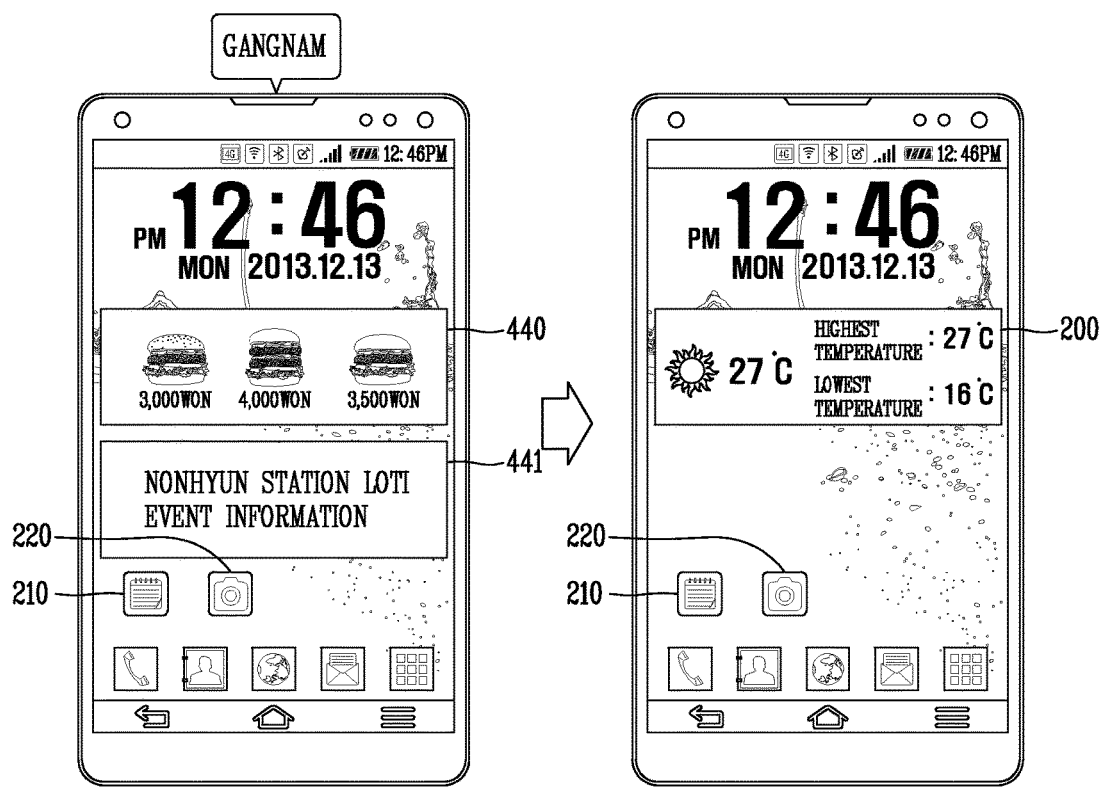

FIGS. 6A and 6B are conceptual views illustrating a method of outputting a graphic object including particular information on a home screen page.

In an exemplary embodiment of the present disclosure, graphic objects including information may be output on a home screen page. As illustrated in FIG. 6A, the home screen page, an idle screen, may include icons 210 and 220 and a widget 200. The icons 210 and 220 may represent applications installed in the mobile terminal. Also, the icons 210 and 220 may be associated with functions executing applications represented by the icons, respectively.

The widget 200 may not execute applications installed in the mobile terminal and may be associated with a function providing simple information related to the application. For example, the widget 200 may provide an execution screen of an application associated with the widget 200 on the home screen page. For example, as illustrated in FIG. 6A, the control unit 180 may output the widget 200 including weather information on the home screen page.

Meanwhile, when particular information is selected according to a user's control command, the control unit 180 may receive at least one related information from the external server on the basis of the particular information and state information of the mobile terminal.

Here, the control unit 180 may output a graphic object including the particular information and the at least one information received from the external server on the display unit 151. In this case, on the basis of a preset condition, the control unit 180 may output the graphic object including the particular information and the at least one information received from the external server on the home screen page. Here, the preset condition may be a case in which particular information is selected by the user when state information of the mobile terminal is identical to a preset state, and the like.

Here, the graphic object including the particular information and the at least one information may be output in the form of a widget. For example, as illustrated in FIG. 6A, when particular information is selected, the control unit 180 may output a graphic object 440 including the particular information, in the form of a widget, on the home screen page. Also, when the at least one information is received from the external server, the control unit 180 may output a graphic object 441 including the at least one information, in the form of a widget, on the home screen page.

Also, when a preset condition is met or according to a user request, the control unit 180 may make the graphic objects 440 and 440 including the particular information and the at least one information disappear from the home screen page. Here, the preset condition may be a case in which state information of the mobile terminal is changed, a case in which a predetermined time has lapsed, and the like. For example, as illustrated in FIG. 6B, when a location of the mobile terminal is changed from "Nonhyun" to "Kangnam", the control unit 180 may make the graphic objects 440 and 441 being output in the area of "Nonhyun" disappear from the display unit 151.

In the above, the method of outputting a graphic object including information on a home screen page has been described. In this manner, the user may be provided with useful information on the home screen page without having to perform any separate procedure.

Hereinafter, a method for providing guide information for selecting particular information according to a user's control command will be described.

Figure 7A:
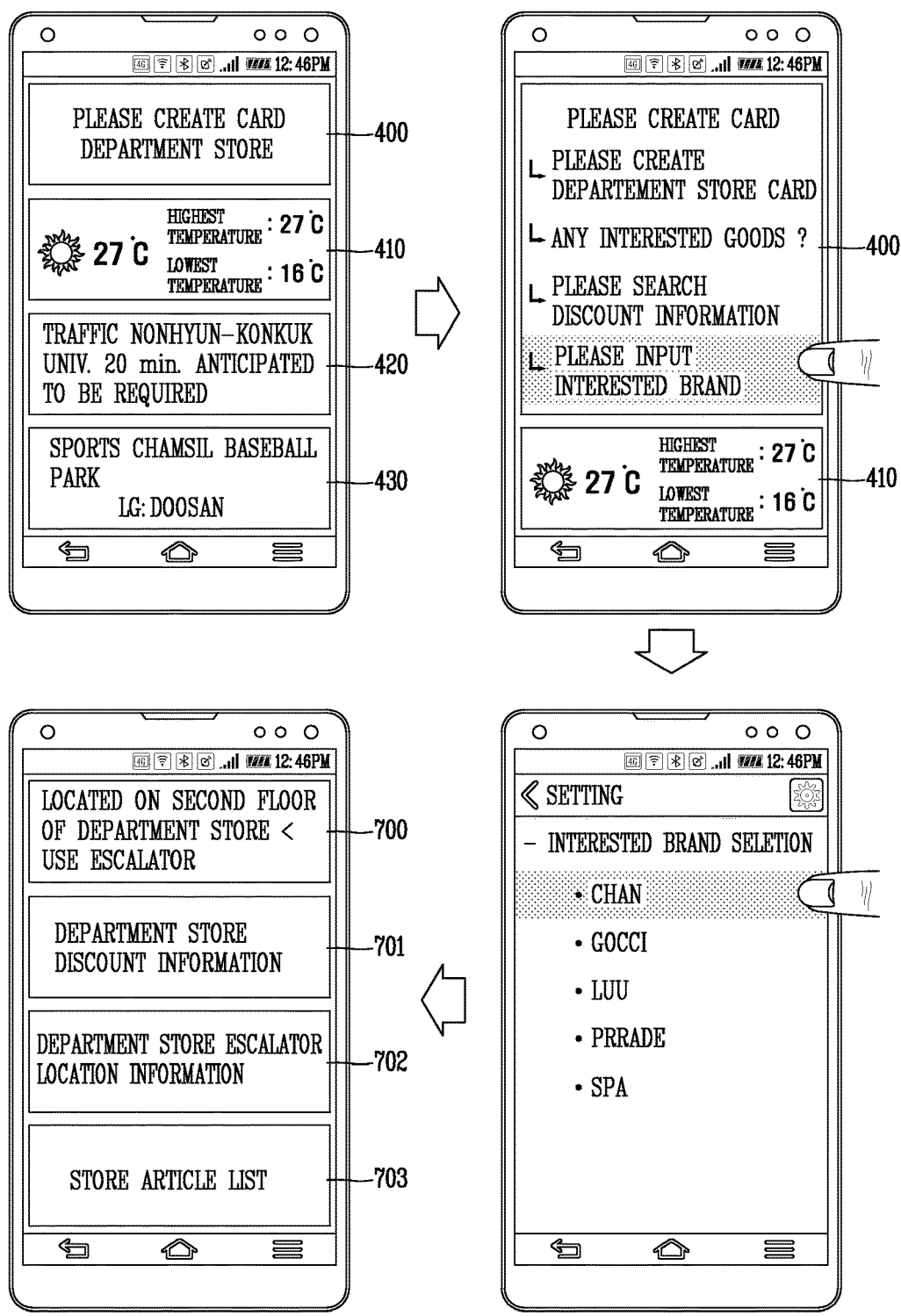
FIGS. 7A, 7B, and 7C are conceptual views illustrating a method of providing guide information indicating that particular information can be received by a user's control command.
Figure 7B:
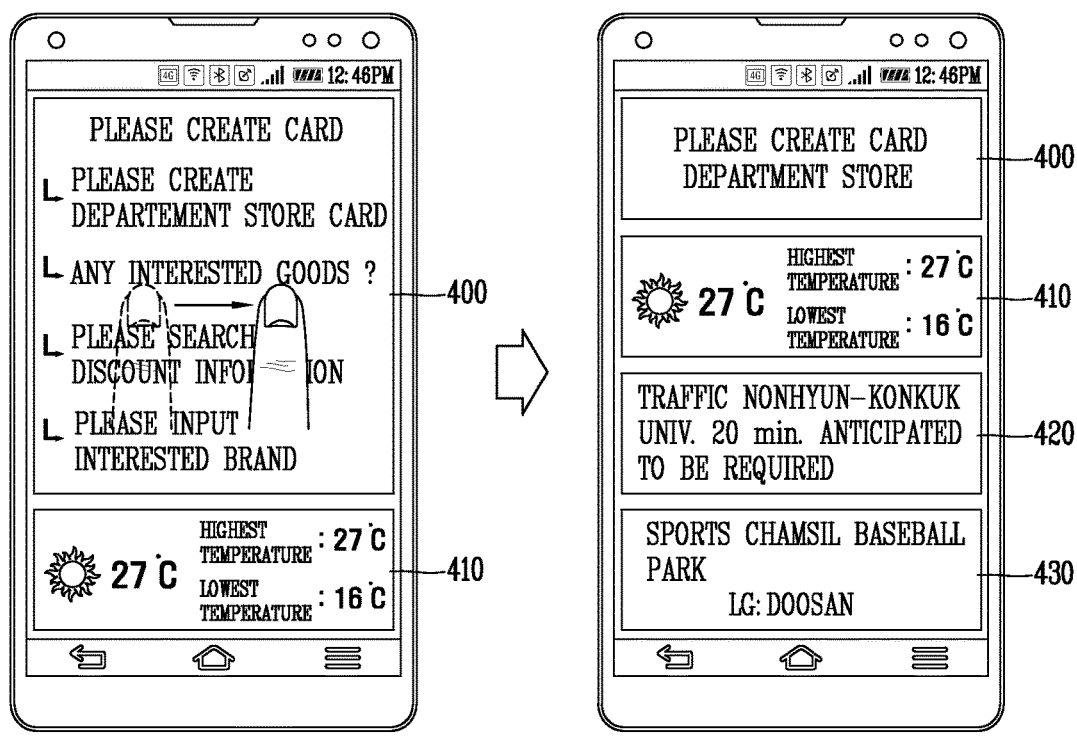
Figure 7C:
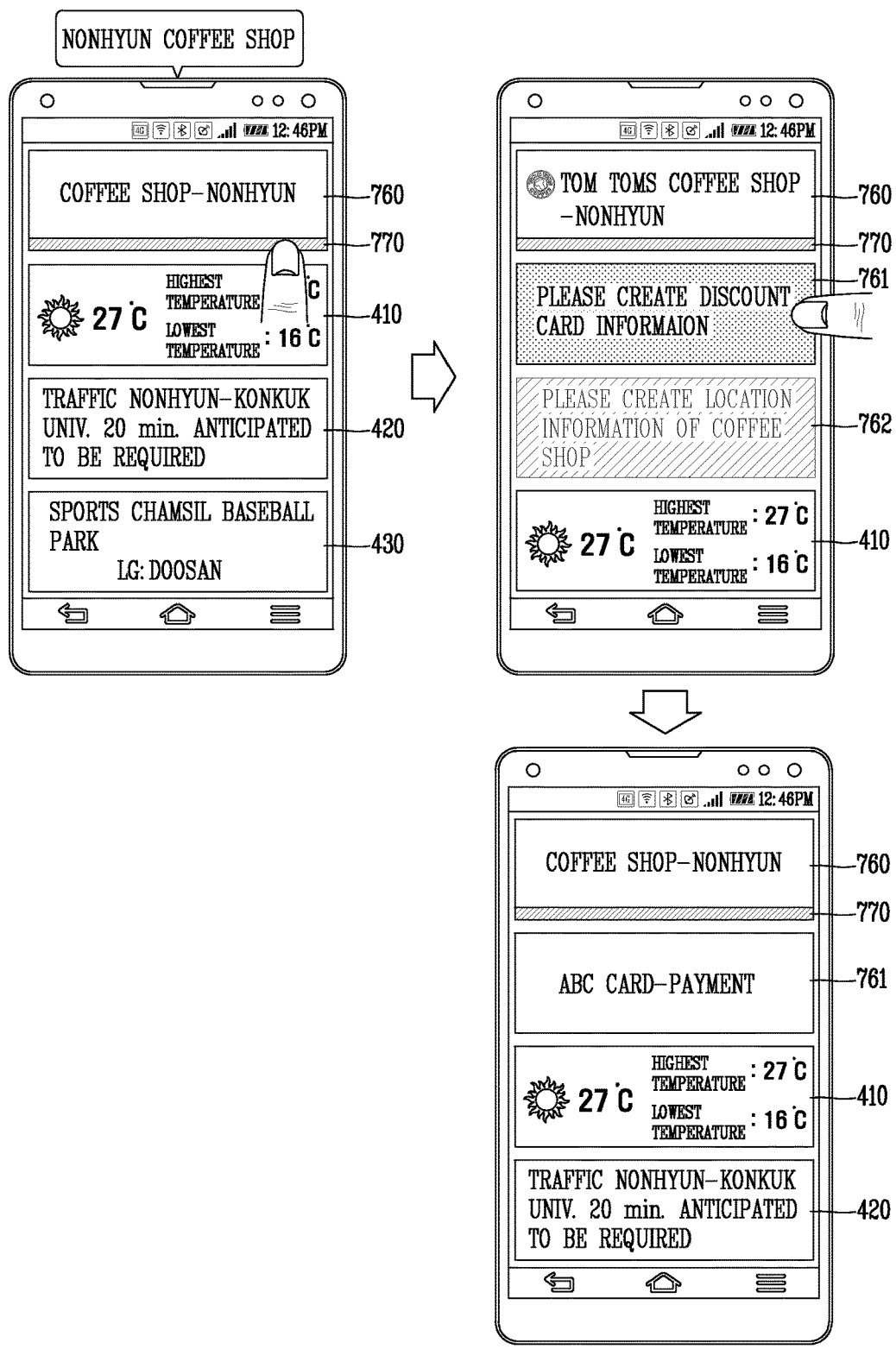

FIGS. 7A, 7B, and 7C are conceptual views illustrating a method of providing guide information for selecting particular information according to a user's control command.

In an exemplary embodiment of the present disclosure, when particular information is selected according to a user's control command, at least one information may be received from the external server on the basis of the particular information and state information of the mobile terminal. Also, when the at least one information is received from the external server, the control unit 180 may output at least one graphic object 410, 420, and 430 including the at least one information on the output unit 151.

Here, the control unit 180 may provide guide information such that the user may select particular information. In detail, the control unit 180 may output a graphic object 400 including at least one guide information selected as particular information according to a user's control command, on the display unit 151. For example, as illustrated in FIG. 7A, when the current location is sensed as "Department store", the control unit 180 may output the graphic object 400 including guide information indicating information related to the department store that can be received from the external server. The user may recognize that additional information can be generated through the guide information.

Also, when any one guide information, among the at least one guide information, is selected, the control unit 180 may output an execution screen related to the guide information on the display unit 151. Here, the user may select at least a portion of screen information of the execution screen related to the guide information as particular information.

For example, as illustrated in FIG. 7A, when guide information indicating "Please input interested brand", among the plurality of guide information displayed on the display unit 151, is selected, the control unit 180 may output screen information for receiving an interested brand.

When the interested brand is selected, the control unit 180 may receive at least one information from the external server on the basis of the selected interested brand and location information. For example, as illustrated in FIG. 7A, a graphic object 700 including selected information and graphic objects 701, 702, and 703 including the at least one information may be displayed on the display unit 151.

In an exemplary embodiment of the present disclosure, a method for allowing the user to easily access information through guide information for selecting particular information is provided.

Meanwhile, when the preset condition is met, the guide information may disappear from the display unit 151. Here, the preset condition may be a condition in which a preset time has lapsed and a condition in which state information of the mobile terminal is changed.

Also, the guide information may disappear from the display unit 151 according to a user's control command. For example, as illustrated in FIG. 7B, when a flicking input is applied to the guide information in a preset direction, the control unit 180 may make the guide information disappear from the display unit 151.

Also, the control unit 180 may output the guide information according to a user input. Here, the control unit 180 may output a graphic object for receiving a request for outputting the guide information. For example, as illustrated in FIG. 7C, the control unit 180 may display a graphic object 770 receiving a request for outputting the guide information in one region of a graphic object 760 including the current location information (Nonhyun, coffee shop).

As illustrated in FIG. 7C, when the graphic object 770 receiving the request for outputting guide information is selected, the control unit 180 may output at least one guide information. Here, the at least one guide information may be included on at least one graphic object 761 and 762.

Also, as illustrated in FIG. 7C, when any one graphic object 761, among the at least one graphic object 761 and 762 including the at least one guide information, is selected, the control unit 180 may output the graphic object 760 including at least one information related to the guide information. For example, when the guide information related to the current location information (Nonhyun, coffee shop) is selected, the at least one information related to the guide information may be discount card information, information regarding a location of a coffee shop, and the like.

Hereinafter, a control method using a plurality of graphic objects in a state in which the plurality of graphic objects including information are displayed on the display unit will be described in more detail.

Figure 8A:
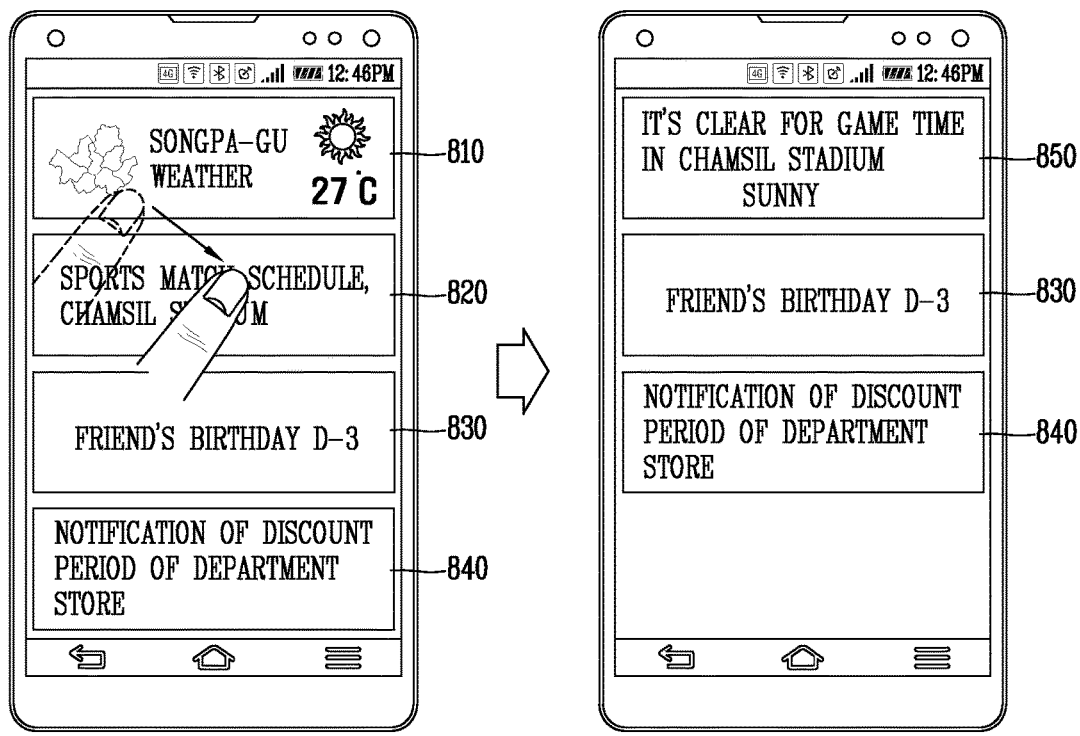
FIGS. 8A, 8B, and 8C are conceptual views illustrating a method of combining a plurality of graphic objects including information.
Figure 8B:
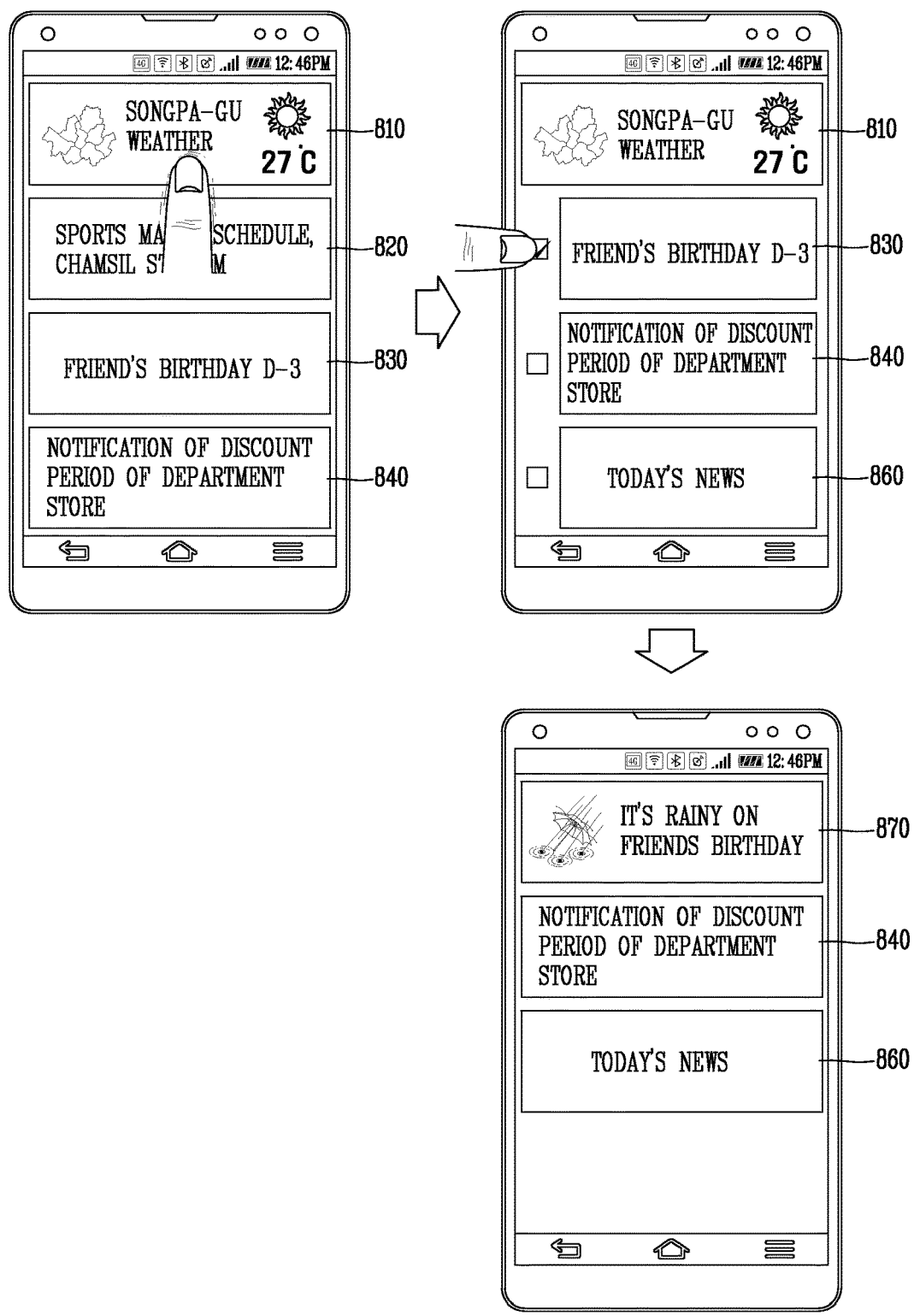
Figure 8C:
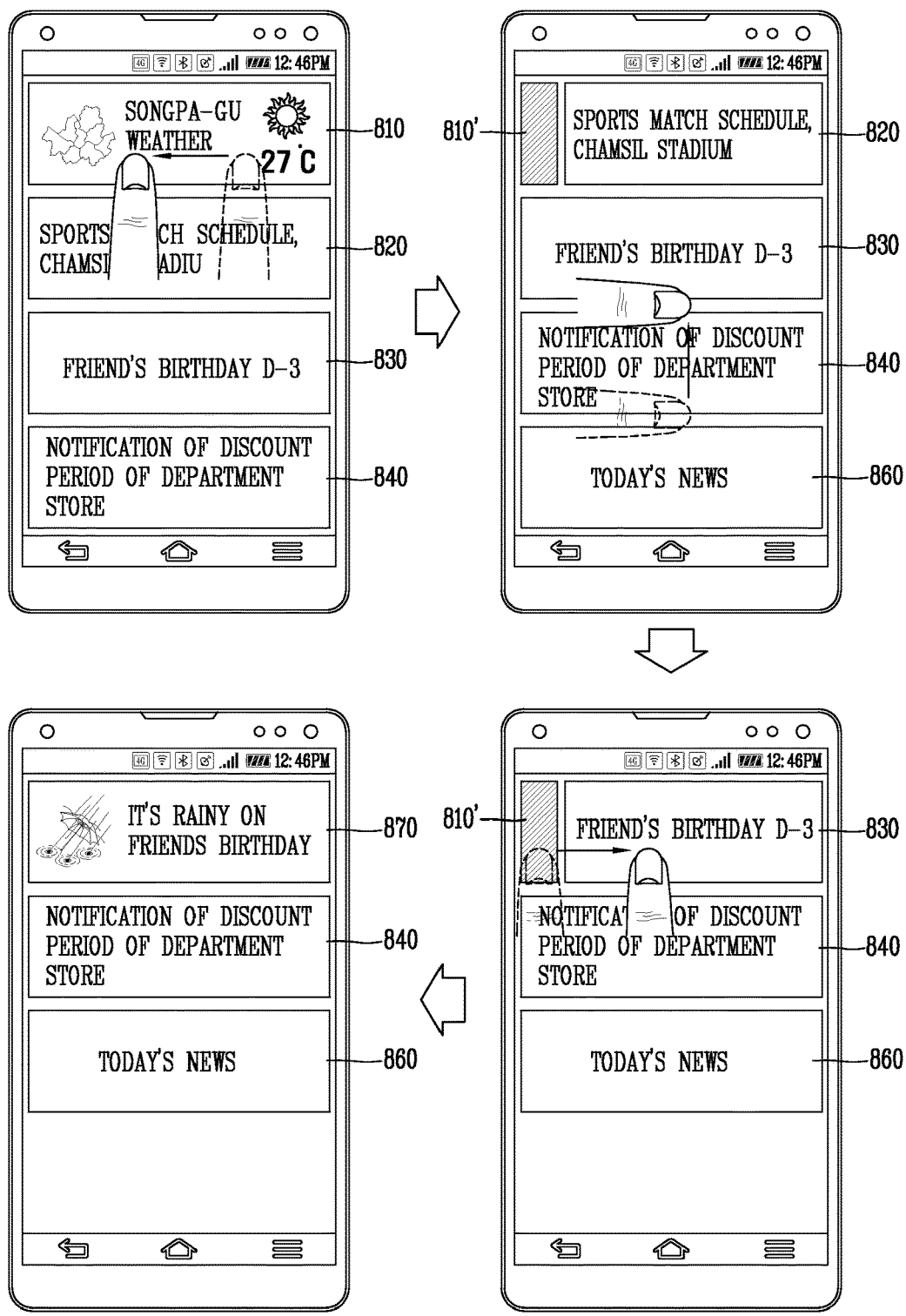

FIGS. 8A, 8B, and 8C are conceptual views illustrating a method of combining a plurality of graphic objects including information.

In an exemplary embodiment of the present disclosure, a plurality of graphic objects 810, 820, 830, and 840 including information may be displayed on the display unit 151. Here, by using at least two graphic objects among the plurality of graphic objects displayed on the display unit 151, the control unit 180 may generate a new graphic object including all of information included in the at least two graphic objects.

Here, generating additional information including all of the information included in the at least two graphic objects and generating a new graphic object including the additional information may be referred to as combining of at least two graphic objects. Hereinafter, the term of combining at least two graphic objects may be understood as generating additional information through information included in at least two graphic objects.

Here, on the basis of a user's control command, the control unit 180 may select at least two graphic objects among the plurality of graphic objects 810, 820, 830, and 840. Here, the user's control command may be a preset type touch input.

For example, as illustrated in FIG. 8A, on the basis of a drag input applied to the graphic object 810 including weather information, the control unit 180 may move the graphic object 810 to the graphic object 820 including sports match schedule information. By using the graphic object 810 including weather information and the graphic object 820 including sports match schedule information, the control unit 180 may generate a graphic object 850 including weather information on a match day.

In another example, as illustrated in FIG. 8B, when a long touch is applied to any one graphic object 810 among the plurality of graphic objects 810, 820, 830, and 840, the control unit 180 may change the other graphic objects 820, 830, and 840, excluding the any one graphic object 810, to a state in which the graphic objects 820, 830, and 840 can be selected. For example, when a long touch is applied to the graphic object 810 including weather information, the control unit 180 may determine that the graphic object 810 including weather in formation has been selected.

Here, as illustrated in FIG. 8B, when the graphic object 830 including schedule information (e.g., friend's birthday) is selected, the control unit 180 may generate a new graphic object 870 including the schedule information and the weather information. For example, the control unit 180 may display the new graphic object 870 including information regarding weather on the friend's birthday, on the display unit 151.

In another example, as illustrated in FIG. 8C, when a drag input is applied to any one graphic object 810, among the plurality of graphic objects 810, 820, 830, and 840, in a preset direction, the control unit 180 may execute a function to combine the graphic object 810 with other graphic object. Here, the drag input in the preset direction may be a drag input applied in a left direction or a right direction within a region in which the any one graphic object 810 is output.

Here, as illustrated in FIG. 8C, in order to indicate that the function to currently combine the any one graphic object 810 with other graphic object is being executed, the control unit 180 may change an output form of the any one graphic object 810. For example, as illustrated in the second drawing of FIG. 8C, the any one graphic object 810 may be changed into a graphic object 810' having a rectangular shape. Here, the graphic object 810' in the rectangular shape may refer to the currently selected graphic object.

Meanwhile, in response to a drag input applied to the display unit 151 in an upward or downward direction, the control unit 180 may perform a scroll function. Here, the scroll function may be a function to move pieces of screen information displayed on the display unit 151. That is, the control unit 180 may move the plurality of graphic objects 810, 820, 830, and 840 in a direction corresponding to the drag input. Here, as illustrated in the third drawing of FIG. 8C, at least some graphic objects 820, among the plurality of graphic objects 810, 820, 830, and 840, disappear from the display unit 151, and a graphic object 860, which has not been output before the scrolling, may be display on the display unit 151. That is, the user may move a graphic object to be combined to a region adjacent to the currently selected graphic object 810' through the scroll function.

Here, as illustrated in FIG. 8C, when the graphic object 830 to be combined is moved to the vicinity of the selected graphic object, the control unit 180 may combine information included in the selected graphic object 810' and information included in the graphic object 830 to be combined according to a drag input applied from the region in which the selected graphic object 810' is output to a region in which the graphic object 830 to be combined is output.

Here, as illustrated in FIG. 8C, the control unit 180 may combine schedule information "friend's birthday" and weather information to display a graphic object 870 including information regarding "weather on the friend's birthday" on the display unit 151.

Meanwhile, the at least two graphic objects combined to generate the new graphic object may disappear from the display unit 151 when the new graphic object is generated, or may be output as is regardless of the generation of the new graphic object.

In the above, the method for generating a new graphic object including additional information by combining at least two graphic objects including information has been described. In this manner, the user may be provided with additional information generated by combining various information, as well as being simply provided with information.

Hereinafter, a method for separating a graphic object including a plurality of information will be described.

FIGS. 9A, 9B, 9C, and 9D are conceptual views illustrating a method of separating a graphic object including a plurality of pieces of information.

In an exemplary embodiment of the present disclosure, additional information may be generated by using at least two graphic objects each including different information, and a new graphic object including the additional information may be output on the display unit 151. Here, the additional information, information related to mutually different information, may be received from the external server on the basis of the mutually different information, or may be information generated by using a function related to the mutually different information. That is, the control unit 180 may generate additional information by using the pieces of information displayed on the display unit 151 and provide the same to the user.

Meanwhile, in an exemplary embodiment of the present disclosure, a graphic object generated by combining at least two graphic objects may be separated into at least two graphic objects. Here, separating the one graphic object into at least two graphic objects may refer to detecting at least two pieces of information using information included in the one graphic object and displaying the at least two detected pieces of information, by including them in at least two graphic objects, on the display unit 151. Here, the at least two pieces of detected information may be pieces of information which have been present before information included in the one graphic object is generated.

The control unit 180 may separate the one graphic object into at least two graphic objects through various methods.

Figure 9A:
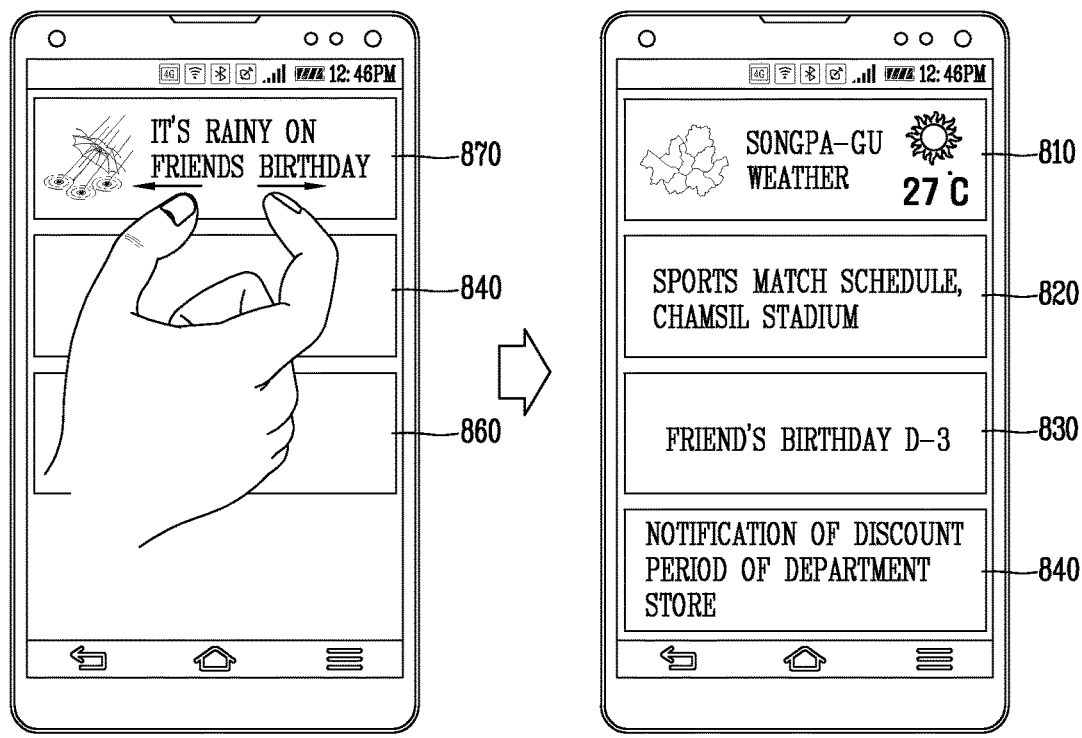
FIGS. 9A, 9B, 9C, and 9D are conceptual views illustrating a method of separating a graphic object including a plurality of pieces of information.

For example, as illustrated in FIG. 9A, when a preset type of touch is applied to a region in which one graphic object 870 generated by combining at least two graphic objects is output, the control unit 180 may separate the graphic object 870 to which the touch has been applied, into at least two graphic objects 810 and 830.

Here, the control unit 180 may detect at least two pieces of information from the information included in one graphic object 870, and include the at least two detected information in at least two graphic objects 810 and 830, respectively.

Figure 9B:
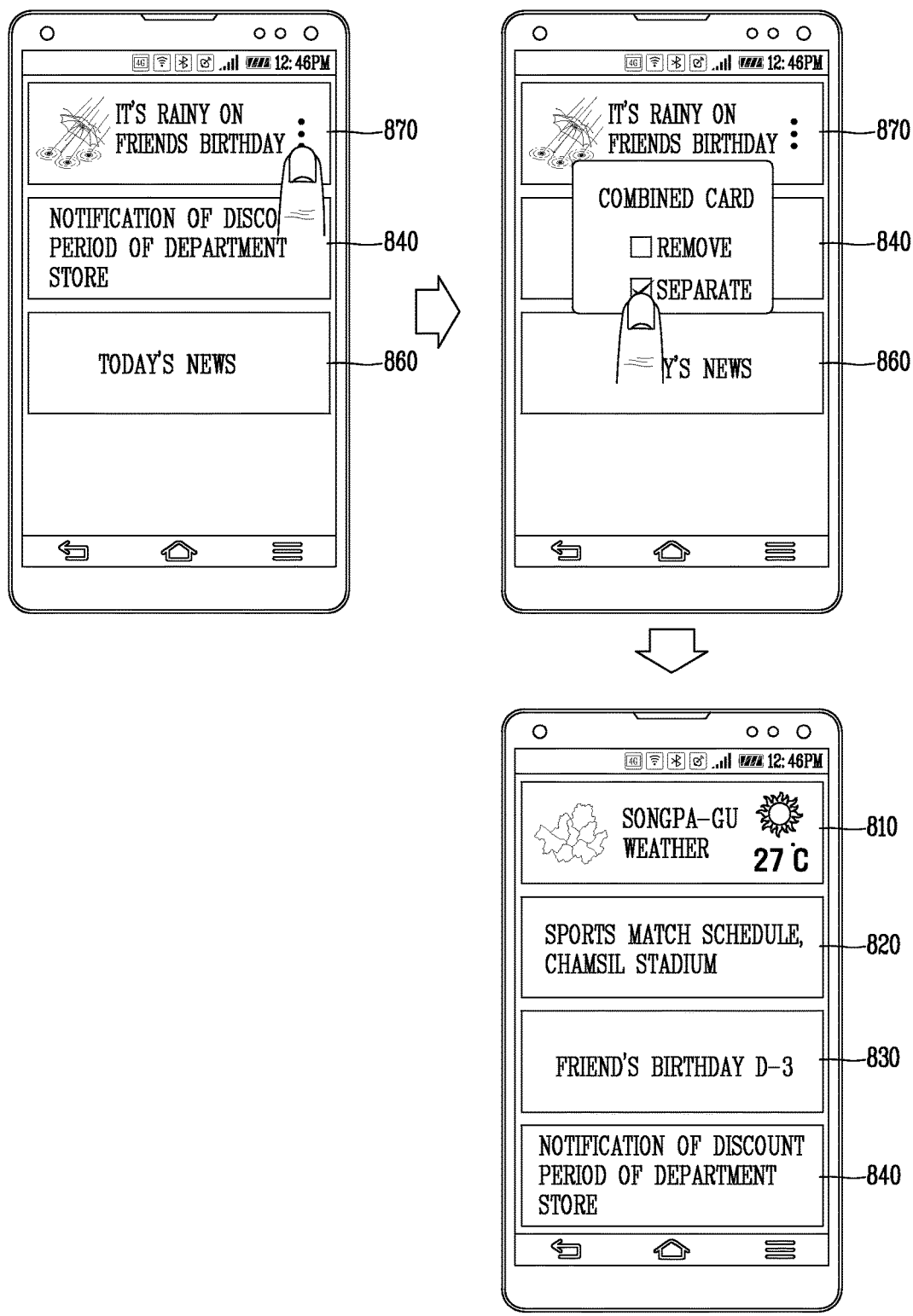

In another example, as illustrated in FIG. 9B, the control unit 180 may output an icon representing a function to separate the information included in the graphic object in a region of the display unit 151. Here, when the icon is selected, the control unit 180 may output a pop-up window indicating a function (which may be referred to as a "separation function", for example) inquiring as to whether to extract at least two pieces of information from the information included in the graphic object and a function (which may be referred to as a "removal function") inquiring as to whether to make the graphic object disappear from the display unit 151.

Here, when the function of extracting at least two pieces of information from the information included in the graphic object is selected, the control unit 180 may extract the at least two pieces of information and display at least two graphic objects 810 and 830 respectively including the at least two pieces of information on the display unit 151.

Meanwhile, in a case in which three or more pieces of information are extracted from information included in one graphic object, the control unit 180 may output a pop-up window for selecting information to be separated among the three or more pieces of information by the user on the display unit 151.

Figure 9C:
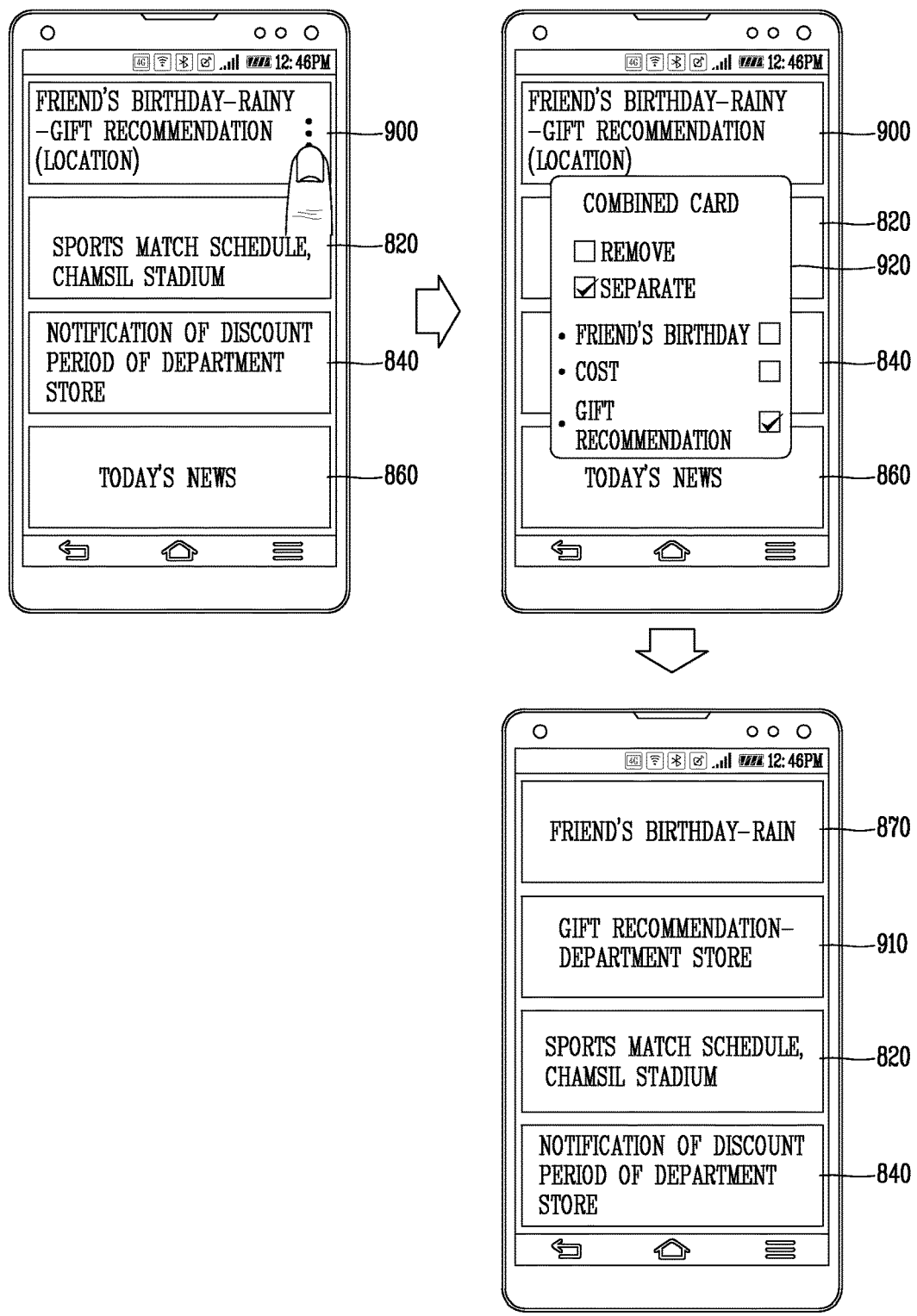

For example, as illustrated in FIG. 9C, when three or more pieces of information are extracted from the information included in any one graphic object 900, the control unit 180 may output a pop-up window 920 indicating the three or more pieces of extracted information on the display unit 151.

Here, when a portion of the three or more pieces of information is selected, the control unit 180 may generate a graphic object including the selected portion of the information and generate a graphic object including the unselected other pieces of information.

For example, referring to FIG. 9C, when one information ("gift recommendation") among three pieces of information ("friend's birthday", "rainy day", and "gift recommendation") is selected, the control unit 180 may display a graphic object 910 including the selected one information and a graphic object 870 including the other unselected information on the display unit 151.

Meanwhile, in the above description, the case in which one graphic object is separated into two graphic objects, the one graphic object disappears from the display unit 151 has been described, but the present invention is not limited thereto and, in a state in which outputting of the one graphic object is maintained, at least two graphic objects may be output.

Figure 9D:
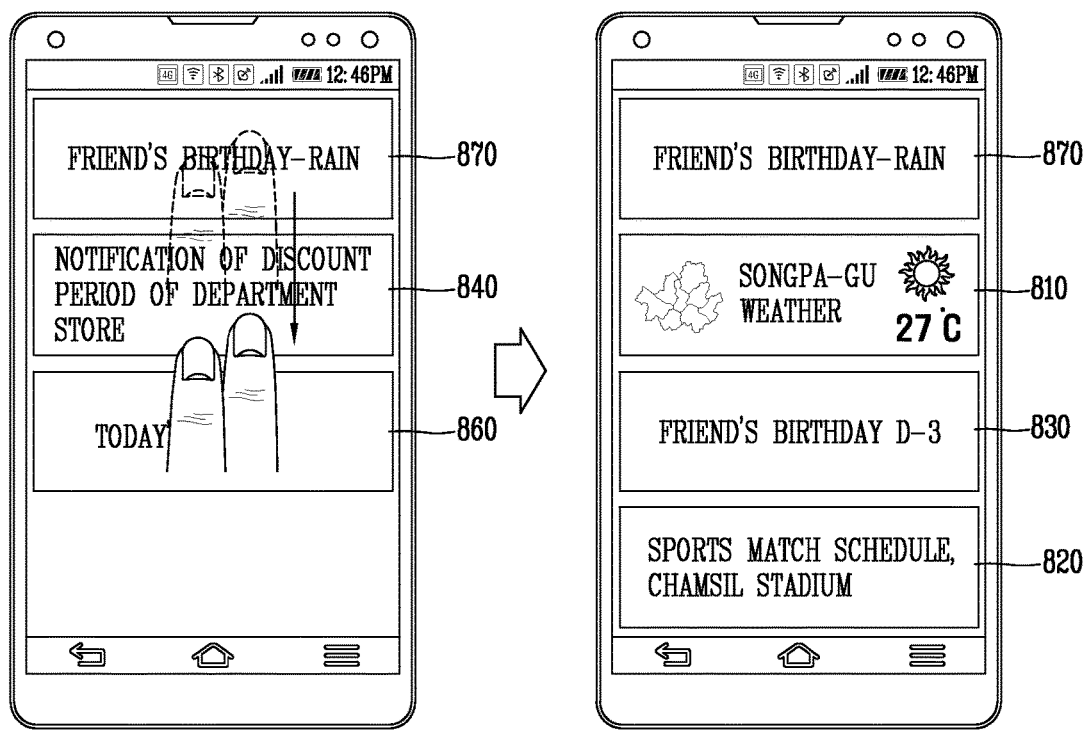

For example, as illustrated in FIG. 9D, when a preset type of touch applied to a region in which a particular graphic object 870 is displayed is sensed, the control unit 180 may extract at least two pieces of information from information included in the particular graphic object 870. Here, the control unit 180 may display at least two graphic objects 810 and 830 including the at least two pieces of extracted information near the region in which the particular graphic object 870 is displayed. In this case, the user may view the information included in the particular graphic object 870 and the at least two pieces of information extracted from the particular graphic object 870 together on the display unit 151.

In the above, the method of separating a graphic object including information into two graphic objects has been described. In this manner, in an exemplary embodiment of the present disclosure, beyond simply providing information, additional information may be extracted from provided information and provided.

Hereinafter, a method for cooperatively operating a graphic object displaying information with an application will be described.

Figure 10A:
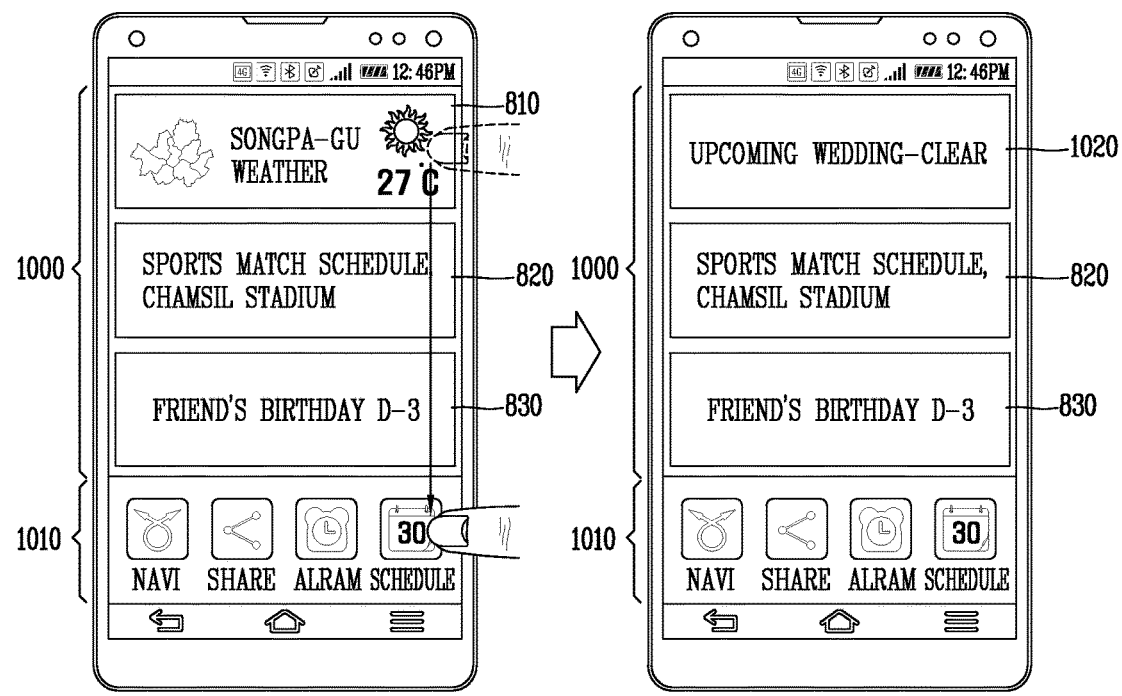
FIGS. 10A and 10B are conceptual views illustrating a method of cooperatively operating graphic objects including information with an application, in the mobile terminal related to an exemplary embodiment of the present disclosure.
Figure 10B:
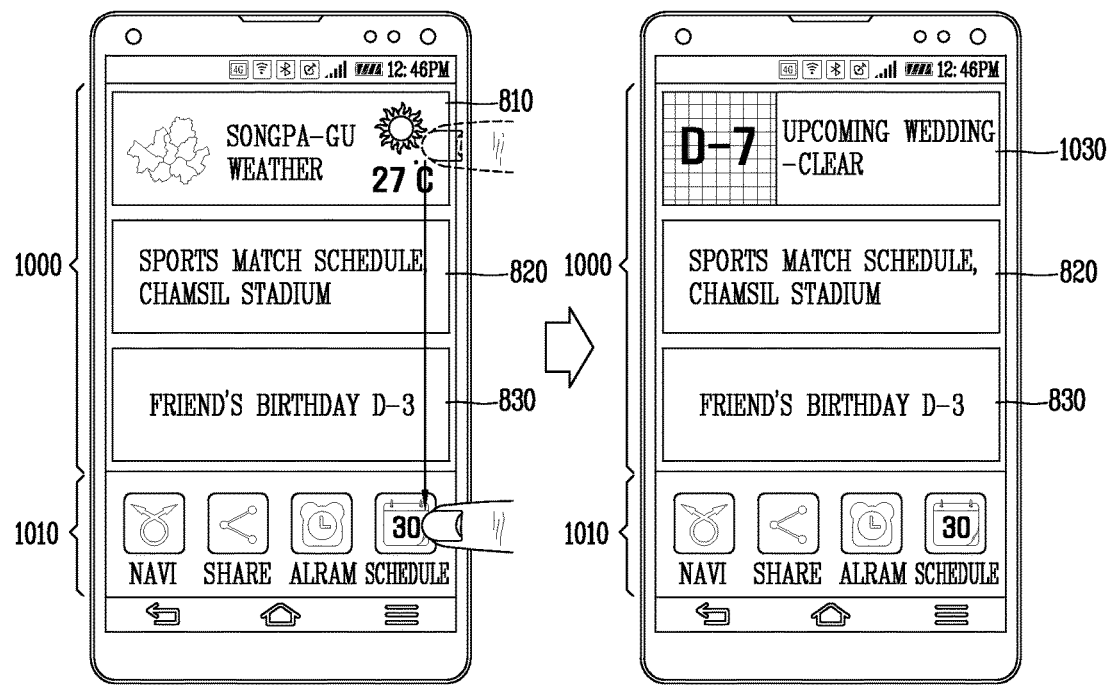

FIGS. 10A and 10B are conceptual views illustrating a method of cooperatively operating graphic objects including information with an application, in the mobile terminal related to an exemplary embodiment of the present disclosure.

In an exemplary embodiment of the present disclosure, not only providing information through graphic objects, but also information included in the graphic objects may interwork with a function of an application. To this end, as illustrated in FIG. 10A, the display unit 151 may include a first region 1000 displaying graphic objects including information and a second region 1010 displaying at least one icon representing applications that can interwork with the pieces of information. Here, the second region 1010 may be output on the display unit according to a user request or may be output together with the first region 1000 all the time.

Also, applications represented by the icons output in the second region 1010 may be previously set applications or applications that may be determined to be able to interwork with the information displayed on the display unit 151. Here, on the basis of the pieces of information currently displayed on the display unit 151, the control unit 180 may detect at least one application among a plurality of applications installed in the mobile terminal.

In response to a user's control command, the control unit 180 may cooperatively operate a graphic object including the information with an application. For example, as illustrated in FIG. 10A, the control unit 180 may sense an applied drag input which starts from any one graphic object 810 among a plurality of graphic objects 810, 820, and 830 displayed in the first region 1000 and terminates in any one icon among a plurality of icons displayed in the second region 1010.

Here, the control unit 180 may process information included in the any one graphic object 810 and a function of the application represented by the any one icon by cooperatively operating them. For example, as illustrated in FIG. 10A, the control unit 180 may process weather information included in the any one graphic object 810 and a schedule management function represented by the any one icon by cooperatively operating them. In detail, when a "wedding schedule" is detected through a schedule management function, the control unit 180 may generate "weather information on the wedding schedule date" and output a graphic object 1020 including the generated information on the display unit 151.

In another example, as illustrated in FIG. 10B, the control unit 180 may output a graphic object 1030 including an execution screen of the schedule management function and the generated information together on the display unit 151. Accordingly, the user may be provided with the schedule management function through the execution screen of the schedule management application. As well as being provided with the schedule management function, the user may also be provided with combined information of the extracted information and information included in the any one graphic object 810.

In the above, the method for processing the graphic object including information and a function of an application by cooperatively operating them has been described. Hereinafter, a method for recommending graphic objects that can be combined with a selected graphic object will be described.

Figure 11A:
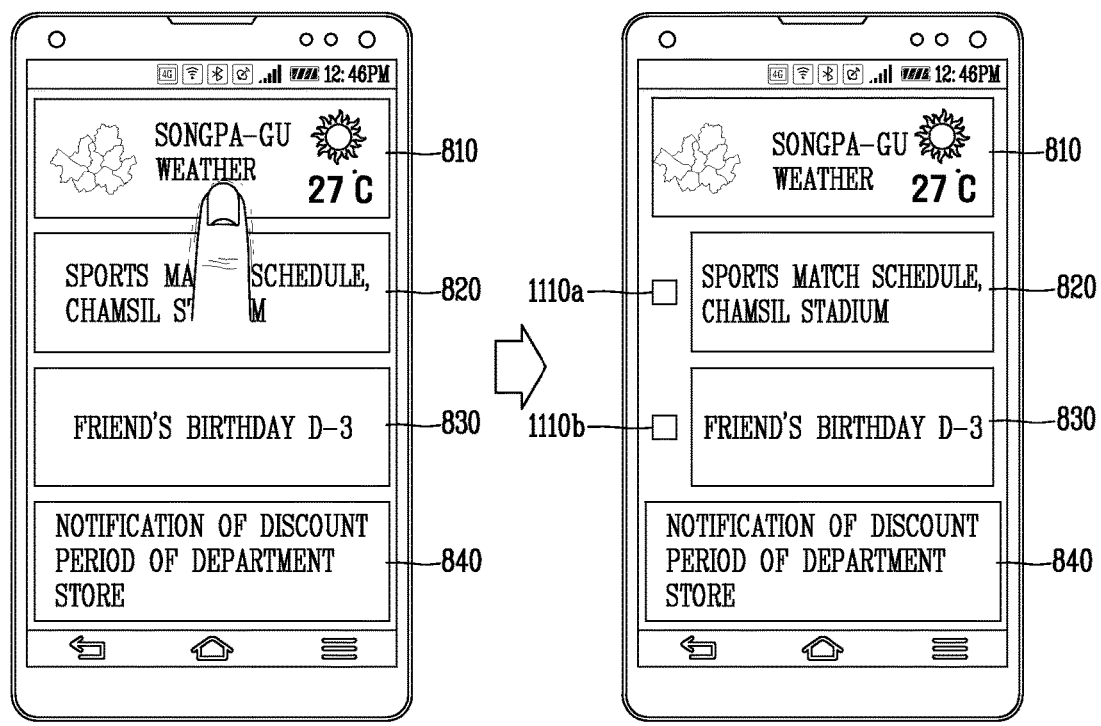
FIGS. 11A and 11B are conceptual views illustrating a method of recommending graphic objects which can be combined with a selected graphic object.
Figure 11B:
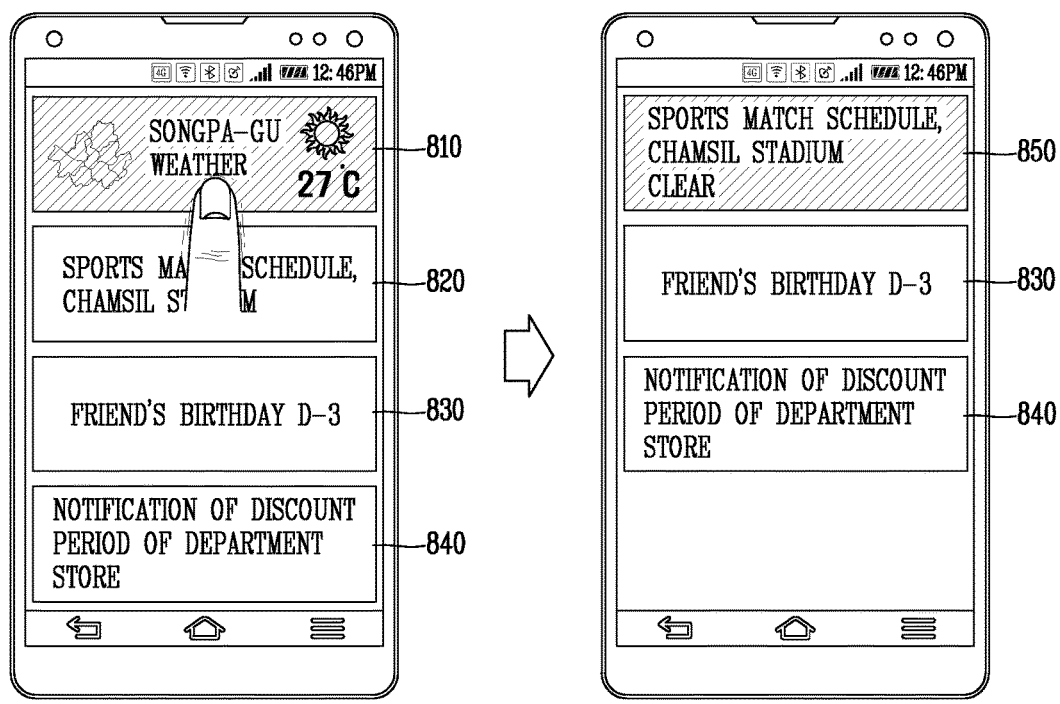

FIGS. 11A and 11B are conceptual views illustrating a method of recommending graphic objects which can be combined with a selected graphic object.

In an exemplary embodiment of the present disclosure, a plurality of graphic objects 810, 820, 830, and 840 including information may be provided on the display unit 151. Here, when any one graphic object among the plurality of graphic objects 810, 820, 830, and 840 is selected, the control unit 180 may display a graphic object including information that can be combined with information included in the any one graphic object 810 such that the graphic object is distinguished from graphic objects including information that cannot be combined.

For example, as illustrated in FIG. 11A, when a long touch is applied to any one graphic object 810, the control unit 180 may detect at least one graphic object 820 and 830 that can interwork with the any one graphic object 810 among the plurality of graphic objects 810, 820, 830, and 840.

Here, the control unit 180 may display selection icons 1110a and 1110b for selecting the at least one detected graphic object 820 and 830 in a region adjacent to the region in which the at least one detected graphic object 820 and 830 is displayed. Here, the control unit 180 may not output the selection icons on a region adjacent to the other remaining graphic object 840 which is not available to be combined.

Meanwhile, when a graphic object that can be combined with any one graphic object among the plurality of objects does not exist, the control unit 180 may display the any one graphic object such that it is visually distinguished from other graphic objects to allow the user to recognize it.

For example, as illustrated in FIG. 11B, when any one graphic object 810 is selected from among a plurality of graphic objects 810, 820, 830, and 840 but there is no graphic object available to be combined, the control unit 180 may output the any one graphic object 810 dimly.

Accordingly, the user may recognize that his or her selected graphic object is not available to be combined.

In the above, the method for recommending a graphic object that can be combined among a plurality of graphic objects, or the method for allowing the user to recognize that there is no graphic object available to be combined have been described. Hereinafter, a method for providing information received from an external device will be described.

Figure 12A:
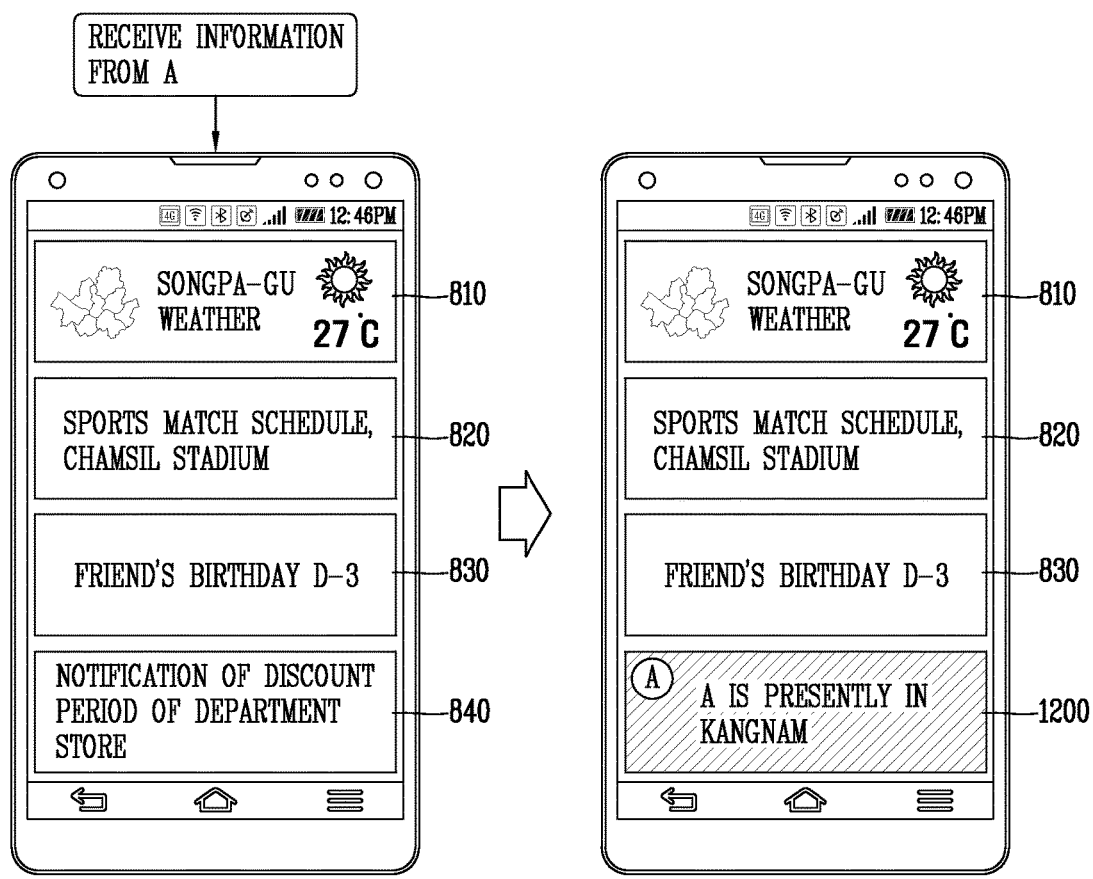
FIGS. 12A and 12B are conceptual views illustrating a method of providing information received from an external terminal.
Figure 12B:
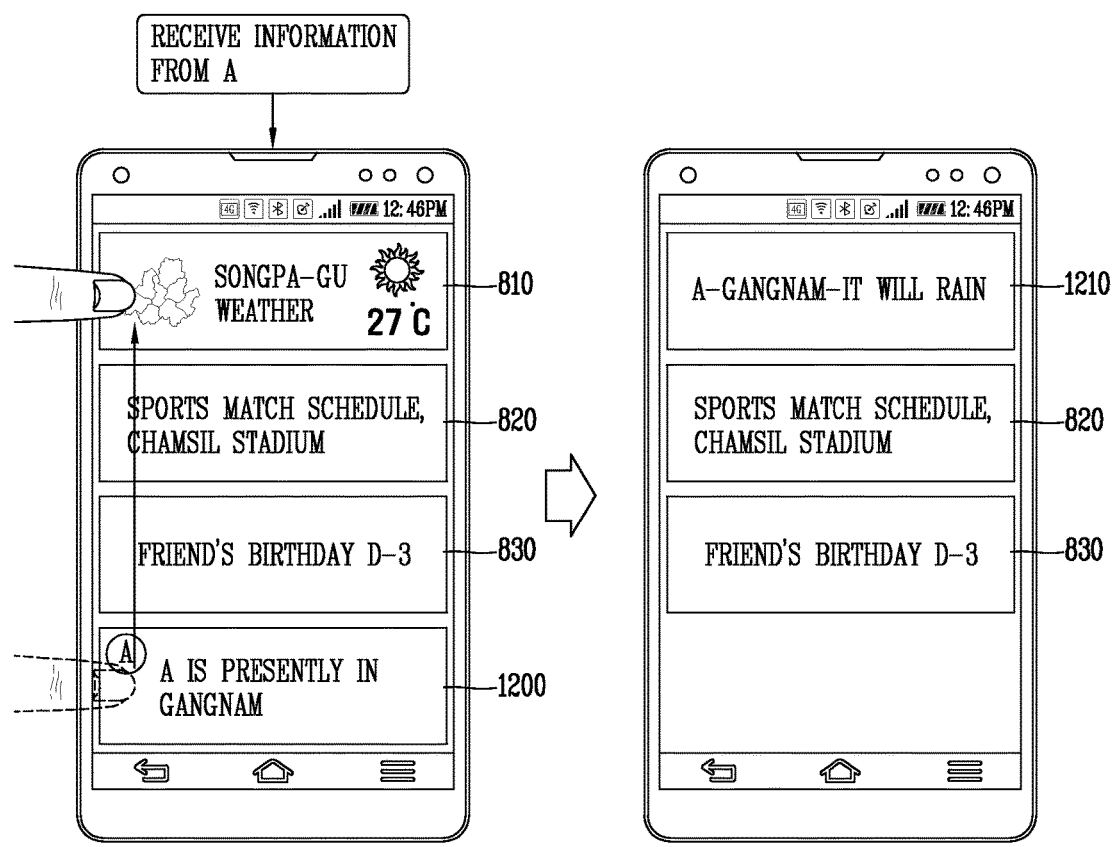

FIGS. 12A and 12B are conceptual views illustrating a method of providing information received from an external terminal.

In an exemplary embodiment of the present disclosure, information may be transmitted and received through communication with an external terminal. Here, when information is received from the external terminal, the control unit 180 may output a graphic object including the received information on the display unit 151.

For example, as illustrated in FIG. 12A, in a state in which a plurality of graphic objects 810, 820, 830, and 840 including information are output, when information is received from the external terminal, the control unit 180 may output a graphic object 1200 including the information received from the external terminal on a region of the display unit 151.

Here, the control unit 180 may output the information received from the external terminal such that the information is visually distinguished from the plurality of graphic objects 810, 820, 830, and 840. For example, the control unit 180 may output identification information of the external terminal in the graphic object 120 including the information received from the external terminal, together.

Accordingly, the user may distinguishably recognize the information received from the external terminal from other information.

In addition, the control unit 180 may combine the information received from the external terminal and the plurality of graphic objects displayed on the display unit 151. For example, as illustrated in FIG. 12B, in a state in which the plurality of graphic objects 810, 820, and 830 and the graphic object 1200 including information received from the external terminal are displayed, the control unit 180 may sense an applied drag input, which starts from a region in which the graphic object 1200 including the information received from the external terminal is displayed and terminates in the any one graphic object 810 among the plurality of graphic objects 810, 820, and 830.

Here, the control unit 180 may generate additional information by using the information received from the external server and information included in the anyone graphic object 810, and output a graphic object 1210 including the additional information on the display unit 151. That is, in an exemplary embodiment of the present disclosure, information may be received from the external terminal and various types of information may be provided to the user.

In the above, the method for providing information received from the external terminal has been described. Hereinafter, a method for performing various controlling in relation to a graphic object will be described.

Figure 13A:
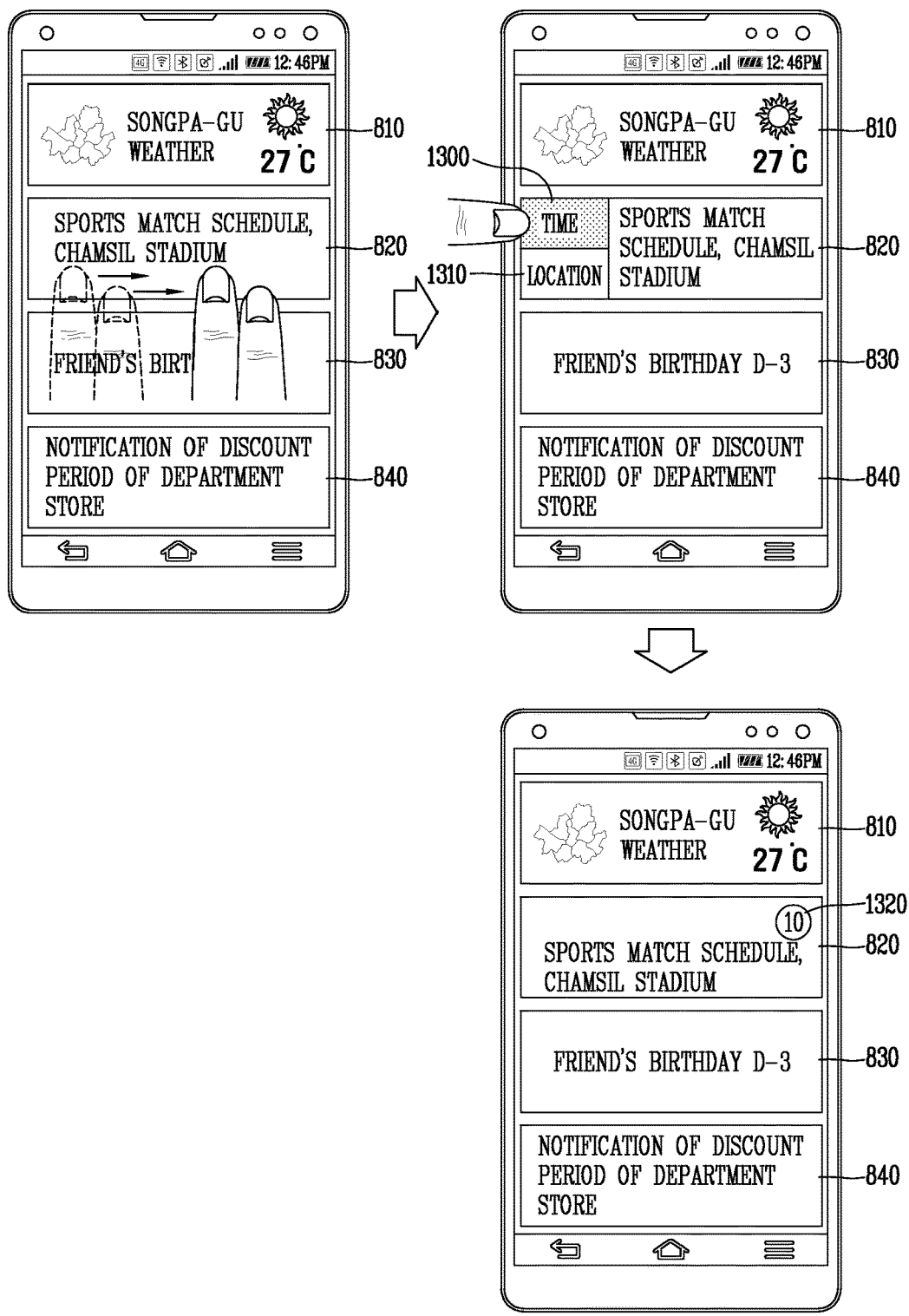
FIGS. 13A, 13B, and 13C are conceptual views illustrating a method of performing various controlling in relation to graphic objects including information.
Figure 13B:
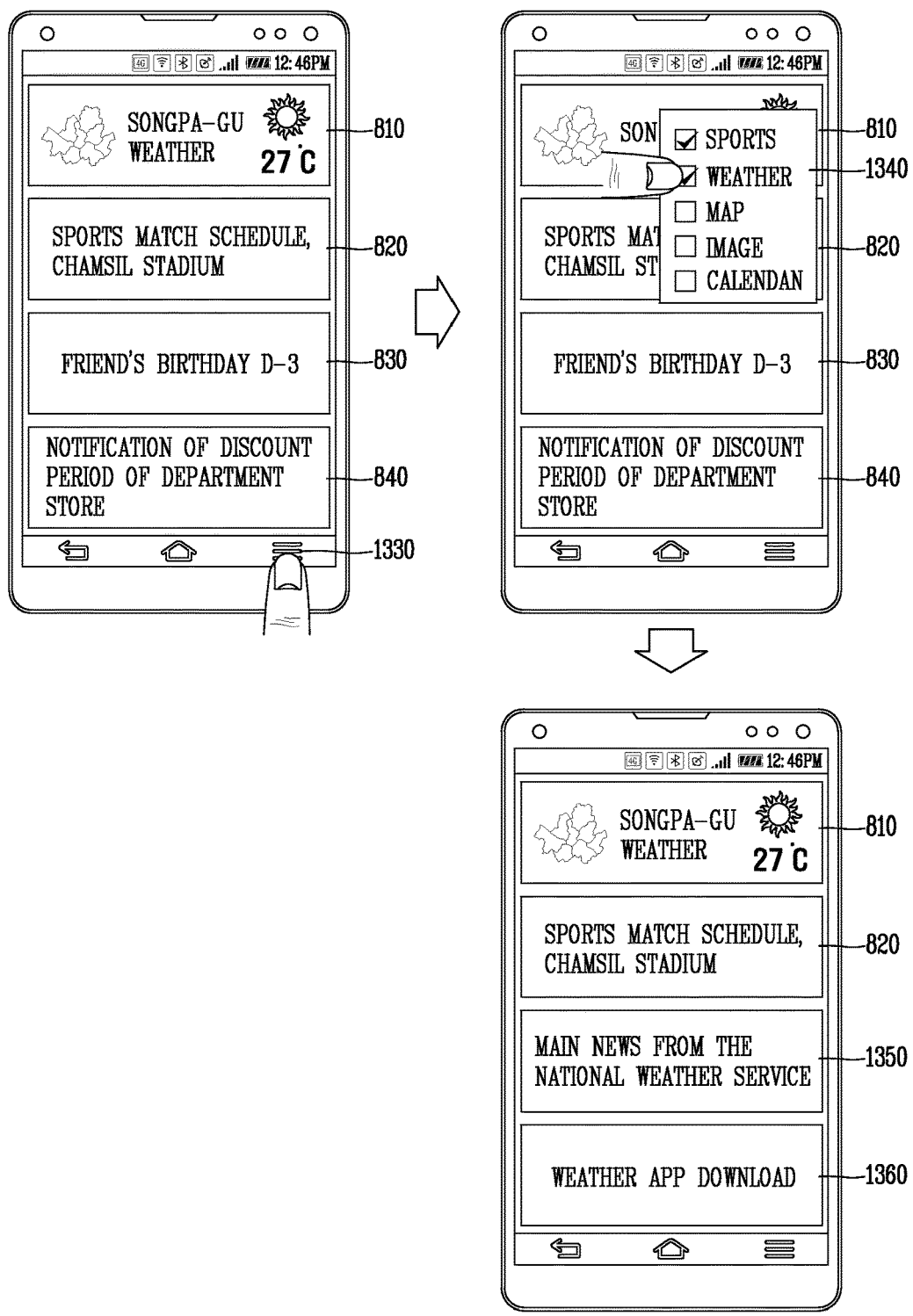
Figure 13C:
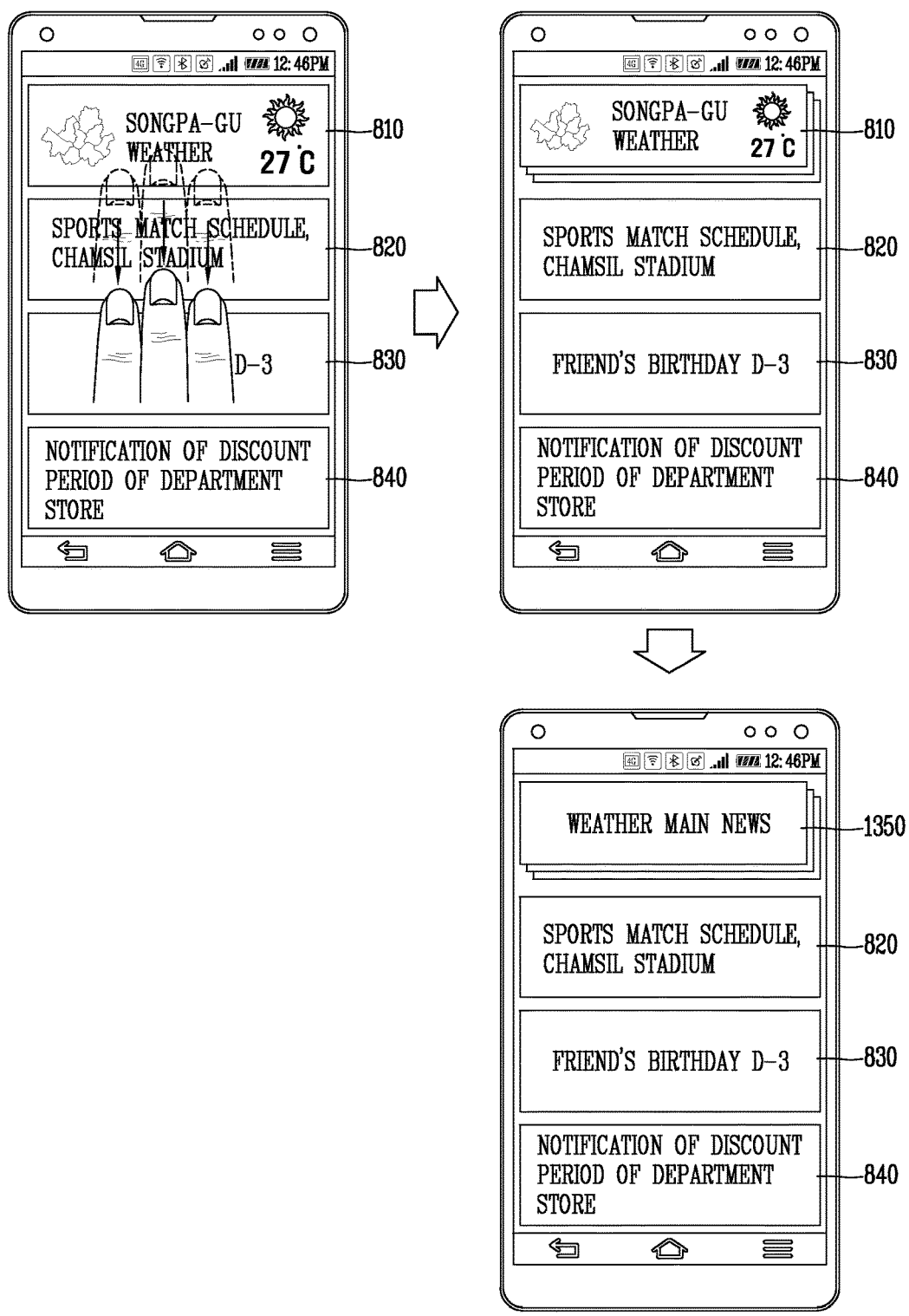

FIGS. 13A, 13B, and 13C are conceptual views illustrating a method of performing various controlling in relation to graphic objects including information.

In an exemplary embodiment of the present disclosure, in a state in which a plurality of graphic objects are output on the display unit 151, when a preset type of touch is applied to any one graphic object, a function associated with the graphic object may be performed.

For example, as illustrated in FIG. 13A, in a case in which touches simultaneously applied to two points on a region in which any one graphic object 820 is displayed are sensed, the control unit 180 may output icons 1300 and 1310 representing a function for setting a time and a function for setting a position with respect to information included in the any one graphic object 820.

For example, when the function for setting a time is selected, the control unit 180 may execute a function to provide an alarm at a particular time by using information (for example, "Chamsil baseball park, sports match schedule information") included in the any one graphic object 820. Here, when the time is set, the control unit 180 may output notification information 1320 indicating that the time has been set in a region of the region in which the graphic object 820 is output. That is, when a preset type of touch applied to the graphic object is sensed, the control unit 180 may provide a function related to the information included in the graphic object.

Also, on the basis of attributes of information included in the plurality of graphic objects 810, 820, 830, and 840 including different types of information, the control unit 180 may output only a portion of the plurality of graphic objects on the display unit 151. Here, an attribute of information may refer to a type of information. For example, an attribute of information may be classified into information related to sports, information related to weather, information related to position, image information, and the like.

Here, on the basis of an attribute of information, the control unit 180 may provide only particular information according to a user's control command. For example, as illustrated in FIG. 13B, when a user's touch applied to a function button 1330 for outputting information of each attribute information is sensed, the control unit 180 may output an attribute list 1340 including attribute items of information on a region of the display unit 151.

Also, as illustrated in FIG. 13B, when items "sports" and "weather" are selected, the control unit 180 may display at least one graphic object 810, 130, and 1360 including information related to "sports" and "weather" on the display unit 151.

Also, the control unit 180 may output at least one graphic object having the same attribute among the plurality of graphic objects 810, 820, 830, and 840 in the same region in an overlapping manner.

For example, as illustrated in a first drawing of FIG. 13C, when a preset type of touch is applied to any one graphic object 810, the control unit 180 may determine an attribute of information included in the any one graphic object 810. The preset type of touch may be a multi-touch.

As illustrated in a second drawing of FIG. 13C, when the preset type of touch is sensed, the control unit 180 may control the display unit 151 to output graphic objects including the information having the determined attribute in an overlapping manner in a region in which the any one graphic object 810 is displayed. Here, referring to the second drawing of FIG. 13C, the control unit 180 may output the graphic objects in an overlapping manner such that the user may recognize that the at least one graphic object having the same attribute information overlaps.

Here, as illustrated in a third drawing of FIG. 13C, when a flicking input is applied to any one graphic object 810 output in an overlapping manner, the control unit 180 may output a graphic object 1350 including different information having the same attribute information as that of the any one graphic object 810 on the display unit 151.

Accordingly, in an exemplary embodiment of the present disclosure, in a state in which a plurality of graphic objects including different information are output, graphic objects may be provided according to attributes of information included in the graphic objects.

According to an exemplary embodiment of the present disclosure, on the basis of state information of the mobile terminal and information selected by the user, appropriate information required for the user is received form an external server, and the received information may be provided to the user. Accordingly, beyond being simply provided with information, the user may directly select appropriate information and be provided with related information.

Also, in an exemplary embodiment of the present disclosure, since information is provided in the form of a card having high readability visually, a large number of information may be effectively provided. Thus, the user may be simply provided with a large number of information.

Also, in an exemplary embodiment of the present disclosure, various controlling may be performed on provided information through simple manipulation. Thus, the user may utilize provided information in various manners.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a display; and
   a controller configured to:
   obtain information of a state of the mobile terminal, wherein the information of the state comprises at least a location of the mobile terminal, a time, an event, a message, or an application executable at the mobile terminal;
   cause the display to display a first card object comprising first specific information when the state of the mobile terminal satisfies a condition associated with the first specific information, wherein the first specific information is associated with an upcoming scheduled event;
   cause the display to display a second card object comprising second specific information together with the first card object, wherein the second specific information is associated with an attribute of a future point in time;
   receive a touch input to both the first card object and the second card object that are displayed together, wherein the touch input comprises a drag input from one of the displayed first card object or the displayed second card object to the other of the displayed first card object or the displayed second card object;
   generate third specific information at the mobile terminal by applying the first specific information on time included in the second specific information in response to the touch input, wherein the generated third specific information provides combined information of the attribute of the future point in time as related to the upcoming scheduled event;
   display a third card object comprising the generated third specific information;
   cause the display to terminate display of the first card object and the second card object when the third card object is displayed;
   detect at least two information from the third specific information included in the third card object and separate the third card object into at least two card objects in response to a preset touch gesture received at the third card object, wherein each of the at least two card objects includes at least one of the at least two detected information.

2. The mobile terminal of claim 1, wherein the condition comprises at least a threshold time or a threshold location of the mobile terminal.

3. The mobile terminal of claim 1, wherein:
   the second specific information corresponds to weather forecast information or a to-do task to be performed.

4. The mobile terminal of claim 1, wherein the controller is further configured to terminate displaying the first card object when the information of state no longer satisfies the condition.

5. The mobile terminal of claim 1, wherein the controller is further configured to execute an application associated with the first specific information in response to a touch input selecting of the displayed first card object.

6. The mobile terminal of claim 1, wherein:
   the displayed second card object comprises a function icon indicating availability of second specific information based on the state information; and
   the function icon corresponds to a function executable at the mobile terminal using the state information.

7. A method for controlling a mobile terminal, the method comprising:
   obtaining information of a state of the mobile terminal, wherein the information of the state comprises at least a location of the mobile terminal, a time, an event, a message, or an application executable at the mobile terminal;
   displaying a first card object comprising first specific information when the state of the mobile terminal satisfies a condition associated with the first specific information, wherein the first specific information is associated with an upcoming scheduled event;
   displaying a second card object comprising second specific information together with the first card object, wherein the second specific information is associated with an attribute of a future point in time;
   receiving a touch input to both the first card object and the second card object that are displayed together, wherein the touch input comprises a drag input from one of the displayed first card object or the displayed second card object to the other of the displayed first card object or the displayed second card object;
   generating third specific information at the mobile terminal by applying the first specific information on time included in the second specific information in response to the touch input, wherein the generated third specific information provides combined information of the attribute of the future point in time as related to the upcoming scheduled event;
   displaying a third card object comprising the generated third specific information;
   terminating display of the first card object and the second card object when the third card object is displayed; and
   detecting at least two information from the third specific information included in the third card object and separating the third card object into at least two card objects in response to a preset touch gesture received at the third card object, wherein each of the at least two card objects includes at least one of the at least two detected information.

8. The method of claim 7, wherein the condition comprises at least a threshold time or a threshold location of the mobile terminal.

9. The method of claim 7, wherein:
the first second specific information corresponds to weather forecast information or a to-do task to be performed.

10. The method of claim 7, further comprising terminating display of the first card object when the state information no longer satisfies the condition.

11. The method of claim 7, further comprising executing an application associated with the first specific information in response to a touch input selecting the displayed first card object.

12. The method of claim 7, wherein:
the displayed second card object comprises a function icon indicating availability of second specific information based on the state information; and
the function icon corresponds to a function executable at the mobile terminal using the state information.

* * * * *